US011107184B2

(12) United States Patent
Baldus

(10) Patent No.: US 11,107,184 B2
(45) Date of Patent: Aug. 31, 2021

(54) VIRTUAL OBJECT TRANSLATION

(71) Applicant: Adobe Inc., San Jose, CA (US)

(72) Inventor: Michael Baldus, Piedmont, CA (US)

(73) Assignee: Adobe Inc., San Jose, CA (US)

( * ) Notice: Subject to any disclaimer, the term of this patent is extended or adjusted under 35 U.S.C. 154(b) by 65 days.

(21) Appl. No.: 16/573,907

(22) Filed: Sep. 17, 2019

(65) Prior Publication Data
US 2021/0082084 A1 Mar. 18, 2021

(51) Int. Cl.
G06T 3/20 (2006.01)
G06F 3/0484 (2013.01)
G06T 19/00 (2011.01)
G06F 3/0488 (2013.01)
G06F 3/16 (2006.01)
G06F 3/0354 (2013.01)

(52) U.S. Cl.
CPC ............ G06T 3/20 (2013.01); G06F 3/04842 (2013.01); G06F 3/04845 (2013.01); G06F 3/04883 (2013.01); G06T 19/006 (2013.01); *G06F 3/03543* (2013.01); *G06F 3/167* (2013.01); *G06T 2200/24* (2013.01)

(58) Field of Classification Search
None
See application file for complete search history.

(56) References Cited

U.S. PATENT DOCUMENTS

| 10,268,266 | B2* | 4/2019 | Mathey-Owens | ...... G06T 7/579 |
| 10,373,380 | B2* | 8/2019 | Kutliroff | ............... G06T 19/006 |
| 10,928,975 | B2* | 2/2021 | Wang | .................... G06F 3/0346 |
| 2002/0158873 | A1* | 10/2002 | Williamson | ............ G06T 17/00 345/427 |
| 2013/0215109 | A1* | 8/2013 | Miesnieks | ............. G06T 19/006 345/419 |
| 2013/0222385 | A1* | 8/2013 | Dorsey | .................. G06T 19/00 345/427 |
| 2017/0243352 | A1* | 8/2017 | Kutliroff | ............... G06T 19/006 |
| 2017/0374341 | A1* | 12/2017 | Michail | .................. G06T 15/06 |
| 2018/0004283 | A1* | 1/2018 | Mathey-Owens | ...... G06F 3/017 |

(Continued)

OTHER PUBLICATIONS

A. L. D. Santos, D. Lemos, J. E. F. Lindoso, and V. Teichrieb, "Real Time Ray Tracing for Augmented Reality," 2012 14th Symposium on Virtual and Augmented Reality, 2012, pp. 131-140, doi: 10.1109/SVR.2012.8. (Year: 2012).*

(Continued)

*Primary Examiner* — James A Thompson
(74) *Attorney, Agent, or Firm* — Kilpatrick Townsend & Stockton LLP

(57) ABSTRACT

Techniques are disclosed for translating a virtual object within a displayed scene in a digital environment in a realistic and intuitive manner. The realistic and intuitive translation is achieved due to new techniques that are used for determining locations of the virtual object in the digital scene as the virtual object is being translated responsive to user input. In some embodiments, a control plane is constructed based upon a point of interaction with a virtual object and an initial surface in the scene on which the virtual object is located. The constructed control plane is then used to determine locations in the scene for locating and displaying the virtual object as the virtual object is translated from its start position to an end position in the scene.

17 Claims, 18 Drawing Sheets

(56) References Cited

U.S. PATENT DOCUMENTS

2020/0160587 A1*   5/2020  Hunt ........................ G06T 15/06
2020/0319771 A1*  10/2020  Liao ..................... G06F 3/04815
2021/0019036 A1*   1/2021  Wang ....................... G06F 3/014

OTHER PUBLICATIONS

S. Prince et al., "3D live: real time captured content for mixed reality," Proceedings. International Symposium on Mixed and Augmented Reality, 2002, pp. 7-317, doi: 10.1109/ISMAR.2002. 1115062. (Year: 2002).*

"Apple unveils ARKit 2", https://www.apple.com/newsroom/2018/06/apple-unveils-arkit-2/ , updated Jun. 4, 2018, accessed Sep. 17, 2019, 4 pages.

* cited by examiner

VIRTUAL OBJECT TRANSLATION

TECHNICAL FIELD

This disclosure generally relates to displaying virtual objects in digital environments such as in augmented reality environments or applications. More specifically, but not by way of limitation, this disclosure relates to improved techniques for moving or translating a virtual object in a digital environment responsive to user interactions with the virtual object.

BACKGROUND

Various applications and digital environments exist in which a user can manipulate a computer-generated or virtual object, which is displayed on a screen, within the digital environment. For example, the digital environment may be an augmented reality (AR) environment, where one or more virtual objects are displayed along with real-world images or objects. A user can interact with (e.g., select, move or translate) a virtual object via an input device such as a mouse, a stylus, or the user's finger(s) if the display is touch sensitive (e.g., a touch screen). For example, in a touch screen use case, a user can interact with the touch screen using touch gestures (e.g., using a single finger touch) to select a virtual object in the AR environment displayed by the touch screen and then move or relocate the virtual object within the augmented reality (AR) environment using a gesture such as a drag gesture by dragging the finger along the touch screen. As another example, the digital environment may be a computer-generated environment for a video game. In this video game environment, a user may select and then drag a virtual object using a mouse to move the object within the computer-generated environment (i.e., change the location of the virtual object within the computer-generated environment).

When virtual objects are moved in digital environments, users expect a natural, intuitive means of manipulating the locations of the virtual objects similar to how the physical equivalents of the objects would move in the real physical world. When a user interacts with and moves a virtual object within a digital environment, the user's intuition of how the virtual object should respond on-screen when the user interacts with the virtual object is formed by the experience of interacting with corresponding real-world objects, and the user expects the virtual object to also move in a similar realistic manner.

SUMMARY

The present disclosure describes improved techniques for moving or translating a virtual object in a digital environment responsive to user interactions with the virtual object. Techniques are described for smoothly, and in a realistic manner, translating a virtual object within a digital environment or scene in response to interactions with the virtual object. The techniques described herein can be used in digital environments such as augmented reality (AR) environments or applications, non-AR environments (e.g., in a non-AR computer-generated scene in a video game), and the like.

In certain embodiments, techniques disclosed herein are used for translating a virtual object from one location to another within a displayed scene in a digital environment. The virtual object translation techniques described herein enable a user to move a virtual object around within an environment such that the translation of the virtual object is smooth and realistic.

In certain embodiments, the translation techniques described herein are implemented by a computing system that includes a virtual object location subsystem and an AR framework subsystem. The computing system receives information indicative of user interactions with a virtual object in a scene displayed on an output device. For example, the user may interact with the virtual object using touch gestures on a touch screen, using a mouse, etc. Based upon the received information about the user interactions, the computing system identifies the virtual object that the user is interacting with and a point on the virtual object where the user is interacting or touching the virtual object. The computing system then identifies an initial surface in the scene on which the virtual object is located.

The computing system then constructs a control plane based upon the identified point on the virtual object and the identified initial surface. In certain embodiments, the control plane is a plane that is parallel to the identified initial surface, and intersects the identified point on the virtual object. When the user performs a gesture (e.g., a drag gesture using a finger or a pointer) that indicates that the virtual object is to be moved or translated from its current location in the scene, the constructed control plane is used to determine a new location in the scene for positioning the virtual object in the direction of the translation. The computing system updates the scene displayed on the output device by displaying the virtual object in the determined new location.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
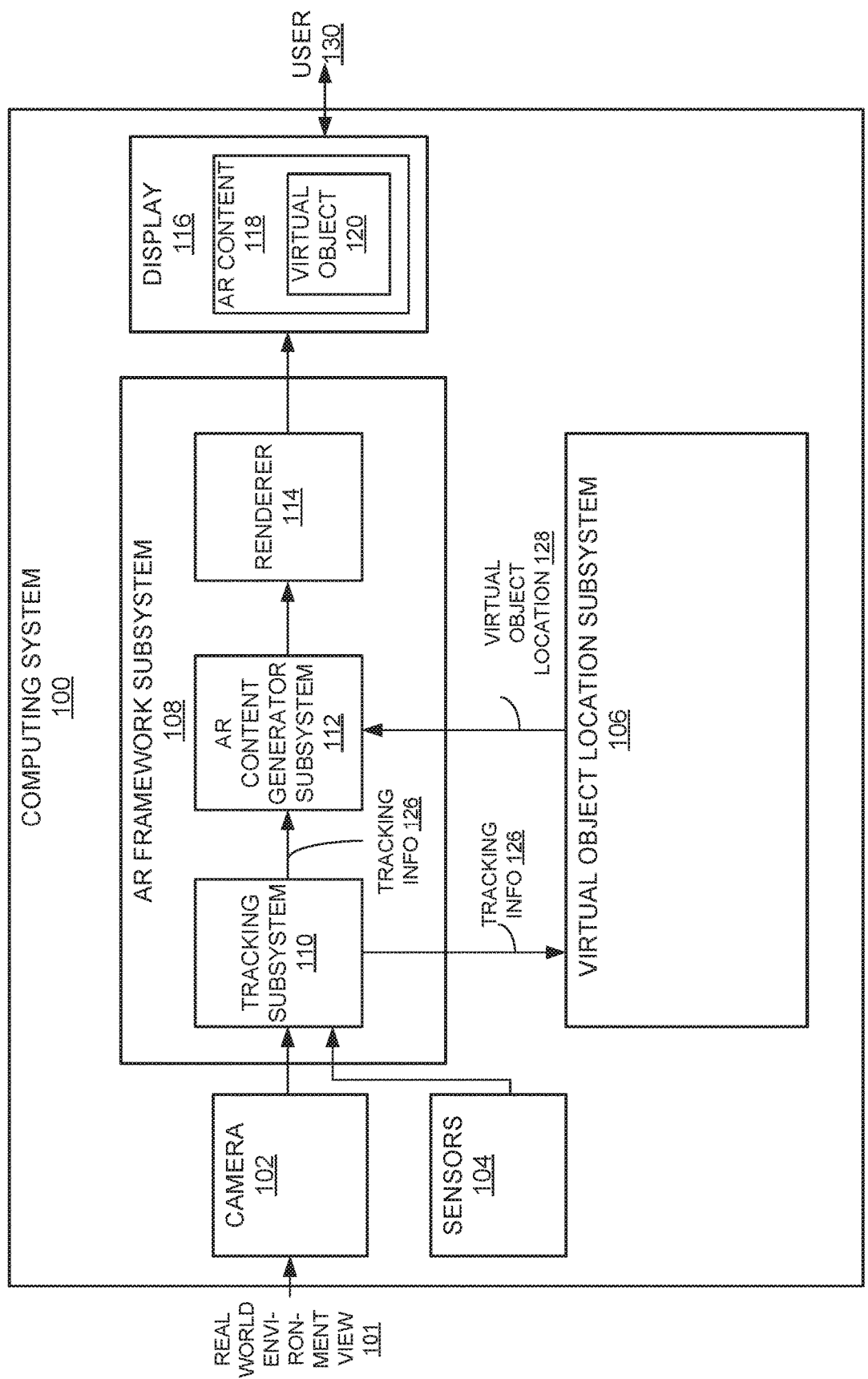
FIG. 1 depicts an example of a computing system for translating a virtual object, according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" is used herein to mean "serving as an example, instance, or illustration." Any embodiment or design described herein as "an example" is not necessarily to be construed as preferred or advantageous over other embodiments or designs. Various embodiments are described herein, including methods, systems, non-transitory computer-readable storage media storing programs, code, or instructions executable by one or more processors, and the like.

The present disclosure describes techniques for smoothly translating a virtual object within a displayed scene in a digital environment. In certain embodiments, the virtual object may be displayed to the user in a real-world environment using augmented reality (AR) techniques. In some other embodiments, the virtual object may be displayed within a scene in other context (e.g., the digital environment may be computer-generated environment).

For purposes of this disclosure, translating a virtual object refers to moving a virtual object from one location to another location within a scene in a digital environment. For example, in a scene in a 3-dimensional digital environment (e.g., a 3-D AR scene) defined by a Cartesian coordinate system, a virtual object's location in the digital environment may be specified by coordinates (x, y, z). The virtual object's initial location in the digital environment may be represented by $(x_i, y_i, z_i)$. When the virtual object is translated or moved, the virtual object is moved by a certain distance from its initial location to a new location within the scene in the digital environment, wherein the new location is represented by coordinates $(x_n, y_n, z_n)$, where at least one coordinate representing the new location has a different value from its corresponding coordinate in the initial location. For purposes of this disclosure, the term moving is synonymous to translating.

The present disclosure describes improved techniques for translating a virtual object in a scene in a digital environment in response to user inputs. Conventional methods for translating a virtual object based on user input have several shortcomings that do not result in realistic movements of the virtual objects within the AR environment. This is due to flaws in the underlying algorithms or techniques that are used for translating the virtual objects. For example, one existing solution for translating a virtual object in an AR environment causes the virtual object to leap or jump from one location to another in an unrealistic manner. Such leaps are particularly prominent if the user attempts to move the virtual object by interacting with extremities of the virtual object. For example, if the user touches a relatively tall virtual object near the top of the virtual object, the virtual object leaps from the current location to the new location in an unrealistic manner that is not natural or intuitive and different from how a user would expect the virtual object to move in the real physical world. Since real-world objects do not teleport, such leap movements are undesirable to the user. Further, it is not intuitive to the user why the virtual object suddenly changed its location to this new location (i.e., "leaped" to the new location). Another existing solution causes virtual objects to diverge from a cue (e.g., the user's finger or a point indicated by a mouse) as they are translated. For example, if the user is dragging the virtual object and translating it deeper into the digital scene with a finger, the virtual object shrinks away from the user's finger as it is moved back into the scene. Conversely, if the user drags a virtual object forward, the virtual object grows in size past the user's finger. This discrepancy is especially apparent on long or tall virtual objects manipulated using their extremities. This behavior is again unrealistic and not desirable.

The present disclosure describes techniques that enable virtual objects to be translated in a realistic and intuitive manner in a scene in a digital environment (e.g., in a scene in an AR environment) ("digital scene") responsive to user input. The realistic and intuitive translation is achieved due to new techniques that are used for determining locations of the virtual object in the digital scene as the virtual object is being translated responsive to user input. In certain embodiments, a virtual object position subsystem is provided for performing processing that facilitates the new improved translation behavior. The virtual object position subsystem uses a new technique for determining the locations of the virtual object as it is being translated responsive to user input such that the overall translation results in realistic and intuitive translation of the virtual object. Upon receiving information indicating that a virtual object is being translated by a user in a digital scene, the virtual object location subsystem determines the location of the virtual object at the start of the translation and the original surface on which the virtual object is located within the digital scene at the start of the translation action. For example, if the user is using a finger gesture on a touch screen to translate the virtual object, the virtual object position subsystem receives signals and information corresponding to the drag gesture performed by the user on the virtual object to move the object from its original location in the digital scene to a new location. A point on the screen that the user is touching is determined. Based upon this point on the screen, a point (pick point) on the virtual object that the user is interacting with is determined by the virtual object position subsystem. The pick point is determined using a ray casting technique. A straight line or ray (pick ray) is cast from a camera (e.g., the camera from whose perspective the scene is rendered) and through the point of user interaction on the screen (e.g., the user touch point on the screen) and into the digital environment scene. The point at which the pick ray intersects the virtual object is set as the pick point. The pick point can be thought of as the point on the virtual object that the user is touching when performing the translation action. The virtual object location subsystem then generates a control plane that is parallel to the original surface that the virtual object was resting on and intersects the pick point on the virtual object. This control plane is then used to determine a location for displaying the virtual object in the digital scene as the user translates the virtual object from its initial location to a new location in the scene. For example, if the user is using a drag gesture using the user's finger to translate the virtual object, the virtual object position subsystem detects and tracks the contact points of the user's finger on the screen during the drag gesture over time, i.e., tracks the user's interactions with the screen during the drag gesture. The user gesture results in a sequence of such screen interaction points ordered based upon time, starting with a start point representing the start of the drag gesture and ending with an end point representing the end of the drag gesture, with one or more intermediate points between the start point and the end point. For each two consecutive points represented by a current point and a next point, a ray is cast into the AR environment where the ray originates at the camera (e.g., the camera from whose perspective the scene is rendered) and passes through the next point of interaction on the screen. The point on the control plane where this ray intersects the control plane is identified as the new location for the virtual object. The digital scene is then updated by rendering the virtual object at this new location instead of its previous location corresponding to the current point. This processing is then repeated for consecutive points in the sequence until the end point is reached, a location in the scene corresponding to the end point is determined, and the virtual object displayed at that location. In this manner, the virtual object position subsystem constructs a control plane and then uses this control plane to identify new locations within the scene for locating and displaying the virtual object during the translation action. This results in translation that is both smooth and intuitive—the disconcerting translation behavior (e.g., leaps or divergence of the virtual object) present in conventional systems is eliminated.

The following non-limiting example is provided to introduce certain embodiments. An application executing on a user's mobile phone displays an AR scene including a virtual object (e.g., a computer generated figurine). Using a drag gesture using the user's finger, the user interacts with the touchscreen of her mobile phone to change the location of the virtual object from its start location to a new final location within the AR scene. The user does this by touching a point on the touchscreen overlapping with the virtual object in order to select the virtual object and then performs a drag gesture to move the virtual object from the start location to the final location within the AR scene. In order to facilitate the translation, the virtual object position subsystem determines an original surface in the AR scene on which the virtual object is located at the start of the translation. The point on the screen that the user touches at the start of the drag gesture is used to determine a pick point ("$p_0$") on the virtual object. The virtual object position subsystem then generates a control plane such that the control plane is parallel to the original surface and passes through the pick point "$p_0$". This control plane is then used to determine new locations in the AR scene for locating and displaying the virtual object as it is translated from its start location to the final location.

As the user moves her finger across the screen, the virtual object position subsystem detects and tracks the contact points of the user's finger on the screen during the drag gesture over time. The user gesture results in a sequence of such screen interaction points ordered based upon time, starting with a start point representing the start of the drag gesture and ending with an end point representing the end of the drag gesture, with one or more intermediate points between the start point and the end point. For each interaction point in this sequence, a ray originating from a camera position and passing through the interaction point is cast into the AR scene. The point where this ray intersects the control plane determines a new location for positioning the virtual object in the AR scene for that interaction point. The AR scene is then updated by rendering the virtual object at this new location instead of its previous location in the scene. This processing is then repeated for all the interaction points in the sequence of interaction points that represent the user drag gesture.

Augmented Reality ("AR") refers to technology that displays real-world content and digital content simultaneously. AR techniques are used to generate AR content, where the AR content presents a composite view in real-world content is displayed along with virtual content. For example, the AR content may include one or more scenes in which virtual content (e.g., a computer-generated virtual object) is superimposed or overlaid on real-world content (e.g., a view of the real-word environment corresponding to an image or a video stream captured by a camera). The view of the real-world environment may be a view as viewed by the optics of a device such as by a camera of a smartphone.

The terms "field of view" or "angle of view" or "view" for a computing device refer to a portion of the observable real-world environment which is visible to the computing device (e.g., visible to a camera of the device). The field of view for a computing device is dependent upon a given particular location and orientation of the computing device in 3-dimensional (3-D) space in the real-world environment.

Within an AR session, multiple coordinate systems may be defined. In "camera space," coordinates are defined with respect to the view captured by a camera. Camera space coordinates follow the motion of the camera (e.g., as a mobile device moves, the camera space coordinate system will translate with the camera). In "world space," fixed coordinates in a real-world scene are used. An AR system may use world tracking techniques based on data from the camera, along with data from sensors such as an accelerometer and gyroscope, to keep track of the fixed world-space coordinates as the camera moves. The AR system may further establish a "local coordinate space" with an origin corresponding to a virtual object. For example, the bottom of the virtual object, or the midpoint of the virtual object, may be set to the origin of a local coordinate system. Yet another "screen space" or "display space" coordinate system may be used, corresponding to a two-dimensional display surface.

Examples are described in the AR context. However, it should be understood that the techniques described here can be used in other contexts, such as user-initiated translation of a virtual object within a computer-generated environment based on the location of computer-generated surfaces. For example, a user may interact with an object in a video game, and the object may be translated according to the techniques described herein. In this context, surfaces within the video game environment may be used.

Referring now to the drawings, FIG. 1 depicts an example of a computing system 100 including a virtual object location subsystem 106 for positioning a virtual object within an AR scene in cooperation with an AR framework subsystem 108, according to certain embodiments. Computing system 100 may comprise multiple systems and subsystems communicatively coupled to each other. Computing system 100 depicted in FIG. 1 is merely an example and is not intended to unduly limit the scope of claimed embodiments. One of ordinary skill in the art would recognize many possible variations, alternatives, and modifications. For example, in some implementations, computing system 100 may have more or fewer systems or subsystems than those shown in FIG. 1, may combine two or more system or subsystems, or may have a different configuration or arrangement of the subsystem.

In the example depicted in FIG. 1, a camera 102 captures a real-world environment view 101 and sensors 104 capture location information. The virtual object location subsystem 106, in conjunction with the AR framework subsystem 108, executes operations for performing one or more functions used in translating a virtual object. The virtual object is shown to a user 130 via a display 116.

The camera 102 includes hardware and/or software configured to capture a real-world environment view 101. The real-world environment view 101 corresponds to live images of a real environment corresponding to a field of view. These live images capture a view of the observable real-world environment corresponding to the field of view of the camera 102. The live images may correspond to one or more still images and/or live video.

In some embodiments, the camera 102 includes one or more elements for receiving the real-world environment view 101. Examples of such elements include a Charge-Coupled Device (CCD) and a Complementary Metal-Oxide-Semiconductor (CMOS) image sensor. The camera 102 is communicatively coupled to the AR framework subsystem 108 and is configured to transmit the real-world environment view 101 to the AR framework subsystem 108.

The sensors 104 include hardware and/or software capable of capturing location and orientation information associated with the computing system 100. The computing system 100 may include one or more types of sensors 104. Examples of types of sensors 104 include a gyroscope, a Global Positioning System (GPS) receiver, a Light Detection and Ranging (LIDAR) receiver, a sonar receiver, an accelerometer, a Passive InfraRed (PIR) sensor, and a camera (e.g., enabled with a filter to selectively receive infrared light).

The computing system 100 includes functionality to receive input from a user 130. In some embodiments, user input may be received via the display 116 (e.g., via a touchscreen). Alternatively, or additionally, the image capture device may include one or more buttons, a keyboard, mouse, microphone with voice recognition software, and/or the like, for receiving user input. The user input may correspond to an indication of one or more points on the display 116. The user input may be received, as examples, by detecting a point on the display touched by the user and/or a voice command.

The AR framework subsystem 108 includes hardware and/or software configured to generate an AR environment. In some embodiments, the AR framework subsystem 108 includes a tracking subsystem 110, an AR content generator subsystem 112, and a renderer 114.

In some embodiments, the tracking subsystem 110 is configured to perform tracking during an AR session. During an AR session, tracking subsystem 110 is configured to maintain a correspondence between the real-world environment space that the computing system 100 inhabits and a virtual space where virtual AR content is modeled and placed. The tracking subsystem 110 includes hardware and/or software configured to track and calculate a location and orientation of the computing system 100 in a real-world environment and maintain a correspondence in virtual space in which the virtual object is modeled. The tracking subsystem 110 receives, as input, real-world scene information from the camera 102. The tracking subsystem 110 also receives location and orientation information from one or more sensors 104 of computing system 100. The tracking subsystem 110 tracks and calculates the pose of the computing system 100 in real-time based upon information received from the camera 102 and/or sensors 104.

In some embodiments, the tracking subsystem 110 maps the environment based on the images and/or sensor data retrieved. For example, the tracking subsystem 110 extracts image features such as flat surfaces from a received first image. As a specific example, the tracking subsystem 110 uses visual-inertial odometry to combine motion data and image data to recognize and track features in an image stream obtained by the computing system 100. In some embodiments, the tracking subsystem uses Simultaneous Localization and Mapping (SLAM). SLAM involves incrementally constructing a map of the environment using key points and landmarks within a three-dimensional environment, and may use a combination of image data and other sensor data. The tracking subsystem 110 provides the tracking information 126 to the virtual object location subsystem 106 and the AR content generator subsystem 112.

The virtual object location subsystem 106 includes hardware and/or software configured to identify a virtual object location 128 (i.e., a location for positioning a virtual object). In some embodiments, the virtual object location subsystem 106 receives user input selecting a location (e.g., on a display screen). The virtual object location subsystem 106 may further receive tracking information 126 from the tracking subsystem 110. Based on the selected location and tracking information 126, the virtual object location subsystem 106 determines the virtual object location 128.

In some embodiments, the virtual object location subsystem 106 generates a control plane for use in determining the location for the virtual object. The virtual object location subsystem 106 may generate the control plane based on factors such as an initial location of the virtual object, a plane detected in an AR environment, and/or a user-selected point. For example, the virtual object location subsystem 106 identifies a plane which is both parallel to an original surface on which a virtual object is located and intersecting a user-selected point on the virtual object. As another example, the virtual object location subsystem 106 identifies a plane which is inclined at a predefined angle (e.g., 30 degrees, 45 degrees, 90 degrees, or 180 degrees) from a y-axis of a local coordinate system centered on the virtual object.

In some embodiments, using the control plane, the virtual object location subsystem determines a virtual object location 128 (e.g., a new location to which to move the virtual object 120). For example, the virtual object location subsystem 106 detects, based on user input, a selected location on the display. The virtual object location subsystem 106 generates a pick ray emanating from a camera origin point, through the selected location, into world coordinate space. The virtual object location subsystem 106 identifies a point at which the pick ray intersects the control plane. The point at which the pick ray intersects the control plane is set to the virtual object location 128. Upon identifying a virtual object location 128, the virtual object location subsystem may transmit data characterizing the virtual object location 128 to the AR content generator subsystem 112.

In some embodiments, the AR content generator subsystem 112 includes hardware and/or software configured to augment a real-world scene with virtual content. The AR content generator subsystem 112 generates AR content based upon information received from the tracking subsystem 110 and the virtual object location subsystem 106. The AR content generator subsystem 112 receives data characterizing the virtual object location 128 from the virtual object location subsystem 106. The AR content generator subsystem 112 analyzes the tracking information 226 and the virtual object location 128 to determine an appropriate location for the virtual object with respect to the real-world environment view 101 captured by the camera 102.

In some embodiments, the renderer 114 includes hardware and/or software configured to render the virtual object 120. The renderer 114 overlays the virtual object 120 on a live camera image in a location and orientation determined by the AR content generator subsystem 112 to form AR content 118. The renderer 114 transmits the AR content 118 to the display 116 for output.

In some embodiments, the display 116 includes hardware and/or software configured to present information in a visual form. For example, the display 116 is configured to display Graphical User Interface ("GUI") elements, text, images, video, and/or other data. The display 116 may include, or be communicatively coupled with, elements for receiving user input (e.g., the display 116 may be a touchscreen display). The display 116 presents the AR content 118 including virtual object 120. In some embodiments, the display 116 is part of an output device (e.g., a monitor, mobile phone, or the like which includes the display 116).

Figure 2:
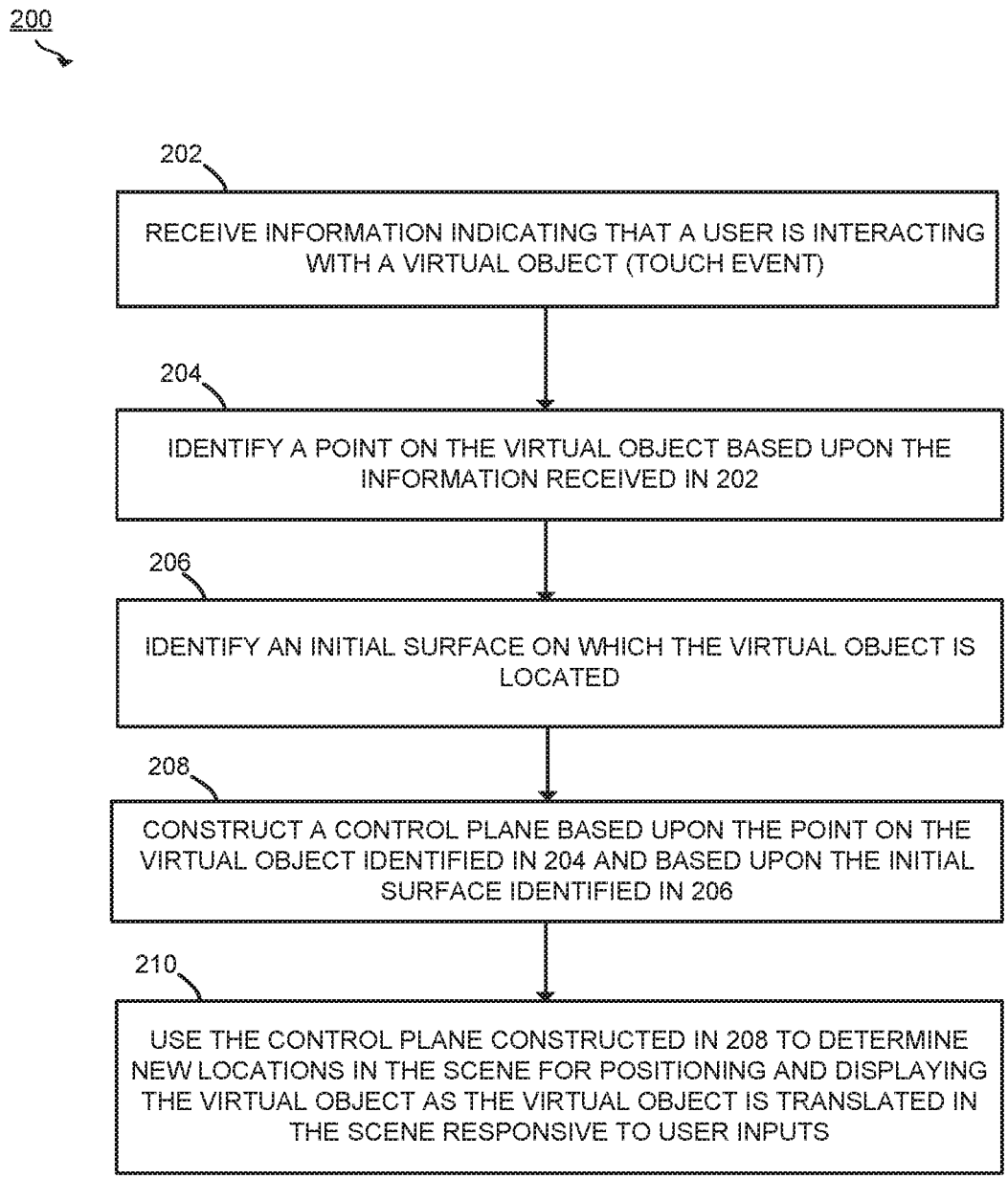
FIG. 2 depicts an example of a flow for translating a virtual object, according to certain embodiments.

FIG. 2 depicts a simplified flowchart 200 depicting a method for translating a virtual object responsive to user input according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 2 may be performed by virtual object location subsystem 106 in cooperation with other components (such as AR framework subsystem 108) depicted in FIG. 1.

The processing depicted in FIG. 2 assumes that an AR scene has been rendered by a computing device using an output subsystem of the computing device. The output subsystem can, for example, be a touch screen or a monitor associated with the computing device. The AR scene displays real-world content along with virtual content (e.g., a virtual object placed with the real-world content). In certain embodiments, the AR scene may be generated by superimposing the virtual content on the real-world content. For example, in the scene, one or more virtual objects may be superimposed on images from a video stream of captured by a camera of the computing device.

In the embodiment depicted in FIG. 1, the AR scene may be generated by AR framework subsystem 108 depicted in FIG. 1. In some embodiments, the AR framework subsystem 108 may initiate an AR session during which locations and orientations of the virtual objects with respect to the real-world environment are tracked. AR framework subsystem 108 may receive live image data from a camera that captures the real-world environment. AR framework subsystem 108 further receives motion and orientation data, such as data from an accelerometer, from a gyroscope, or from other like sensors. In some embodiments, these sensors may be part of the computing device, while in other embodiments one or more of such sensors may be remotely located from the computing device but are communicatively coupled with the computing device. AR framework subsystem 108 then combines the live image data and the virtual content to create the AR scene and uses the motion and orientation data to locate and orient the virtual content with respect to the real-world content. AR framework subsystem 108 uses the image feed and the motion and/or orientation data received over time to locate and orient the virtual objects with respect to the real-world content over time. In some instances, AR framework subsystem 108 may perform the mapping and orientation functions using visual-inertial odometery and/or Simultaneous Localization and Mapping (SLAM) techniques. In some embodiments, AR framework subsystem 108 begins tracking coordinates of the computing device once an AR session has been started and establishes one or more coordinate systems which AR framework subsystem 108 tracks and/or updates as the computing device moves through space.

A user may use different input devices to interact with a virtual object displayed within an AR scene. For example, the user may interact with a virtual object using the user's finger(s) (for example, in situations where the AR scene is displayed using a touch-sensitive screen or touch screen), a mouse or trackball, a keyboard (e.g., using a cursor that is movable using the keyboard), a stylus, a virtual controller (e.g., using a controller visible using an AR/VR headset), and the like. The user interaction may include, for example, the user selecting a virtual object and then moving or translating the virtual object from its original location within the AR scene to a new location within the AR scene.

At 202, location information is received indicating that a user is interacting with a virtual object displayed in the digital scene. The digital scene may be displayed on various types of output screens corresponding to output devices such as a touch screen, a monitor, a display, etc. The term "viewscreen" is used herein to provide a general term for referring to these output devices. The information received in 202 may include information identifying a point ("$vs_0$") on the viewscreen (which is displaying the AR scene and the virtual object the user is interacting with) where the user is interacting with the virtual object.

For example, where the viewscreen is touch-sensitive (e.g., a touch screen), the user may interact with the virtual object using one or more touch gestures, such as by touching the portion of the touch screen displaying the virtual object using a fingertip. The user's interactions with the touch screen using touch gestures may generate touch events that are detected, for example, by virtual object location subsystem 106. Information regarding these touch events is included in the information received in 202. When a user "touches" the virtual object via the touch screen, the point of contact of the user's finger on the touch screen is such that an imaginary vector drawn from the user's eye through the point of contact on the viewscreen intersects the virtual object in the digital scene. The area of the viewscreen where the user's fingertip touches the viewscreen defines a point of contact and represent the point of interaction ($vs_0$") on the viewscreen. See, for example, point of contact $vs_0$ 610 illustrated in FIG. 6B, and point of contact 704 depicted in FIG. 7B. The information received in 202 identifies the point of contact. In instances where a virtual controller is being used, the location of the virtual controller represent the point $vs_0$.

In instances where a user uses a mouse or trackball to interact with the virtual object, the location of a sprite controlled by a mouse or the trackball represents the location of the point $vs_0$ on the viewscreen. In instances where the user uses a keyboard to interact with the virtual object, the location of a cursor controlled by the keyboard represents the location of the point $vs_0$ on the viewscreen. Information identifying the location of point $vs_0$ is included in the information received in 202. As other examples, the user input may be received via a voice command.

At 204, a point on the virtual object being interacted with is identified based upon the information received in 202. In certain embodiments, ray tracing techniques using the location of point $vs_0$ are used to determine a point on the virtual object being interacted with ("initial pick point $p_0$"). According to one ray casting technique, a straight line or ray ("pick ray $\vec{r}$") is cast from a camera (e.g., the camera from whose perspective the scene is rendered) and through the point $vs_0$ into the digital environment. For example, if the digital environment is a three-dimensional AR scene, a ray is cast originating from the camera location through the point $vs_0$ into the three-dimensional AR environment. The ray is defined by a point of origin and a direction from the point of origin. The point of origin is the location of the camera and the direction is provided by a straight line vector originating from the camera location and passing through point $vs_0$. A point on the virtual object where the ray intersects the virtual object is identified as the point on the virtual object for the interaction (initial pick point $p_0$). The point on the virtual object is typically represented in world coordinates. World coordinates are coordinates used to represent the locations of objects, both real-world objects and virtual objects, in the rendered digital scene.

In some embodiments, $vs_0$ is detected in two-dimensional screen-space coordinates. The virtual object location subsystem 106 then translates detected screen-space coordinates to a world coordinate system. The virtual object location subsystem 106 may set the origin of the pick ray to the location of the camera in world space coordinates (which may itself involve translating from camera space to world space). The virtual object location subsystem 106 may generate the pick ray such that the pick ray originates at the camera origin point and passes through the selected point $vs_0$ on the viewscreen.

In certain embodiments, a mesh associated with the virtual object may be identified. For example, the virtual object location subsystem 106 may use a preconfigured virtual object which is defined by a mesh surface. The virtual object location subsystem 106 then determines an intersection point $p_0$ between the pick ray and the mesh. The virtual object location subsystem 106 sets the intersection point between the pick ray and the mesh to the identified point on the virtual object, initial pick point $p_0$. FIG. 6C illustrates an example of an initial pick point $p_0$ 613 on a virtual object 606.

At 206, an initial surface on which the virtual object is located in the digital scene is identified. In some embodiments, this is done based on a plane detected by the AR framework subsystem 108. For example, the AR framework subsystem 108 uses a combination of real-world scene information gathered by the camera and acceleration information gathered by the sensors of the computing device to identify a horizontal plane in the scene.

At 208, the virtual object location subsystem constructs a control plane ("P") based upon the point on the virtual object identified in 204 and based upon the initial surface identified in 206. The control plane may be constructed so as to be parallel to the initial surface identified in 206 and passing through the point on the virtual object identified in 204. In certain embodiments, the control plane in 208 is constructed such that it intersects the point on the virtual object identified in 204 and has a common normal with the initial surface identified in 206. Further details for constructing a control plane are described below with respect to FIG. 3.

At 210, the control plane constructed in 208 is used to determine new locations in the scene for positioning and displaying the virtual object ("virtual object location") as the virtual object is translated in the scene responsive to user inputs. Details of determining the new locations for positioning and displaying the virtual object are described below with respect to FIG. 4. In some embodiments, the system will iteratively perform the operations of FIG. 2 for a series of determined locations (e.g., $p_0, p_1, p_2, \ldots p_n$, as described below with respect to FIG. 4). Accordingly, the system may display the virtual object smoothly moving across the screen in accordance with the information received at 202.

Figure 3:
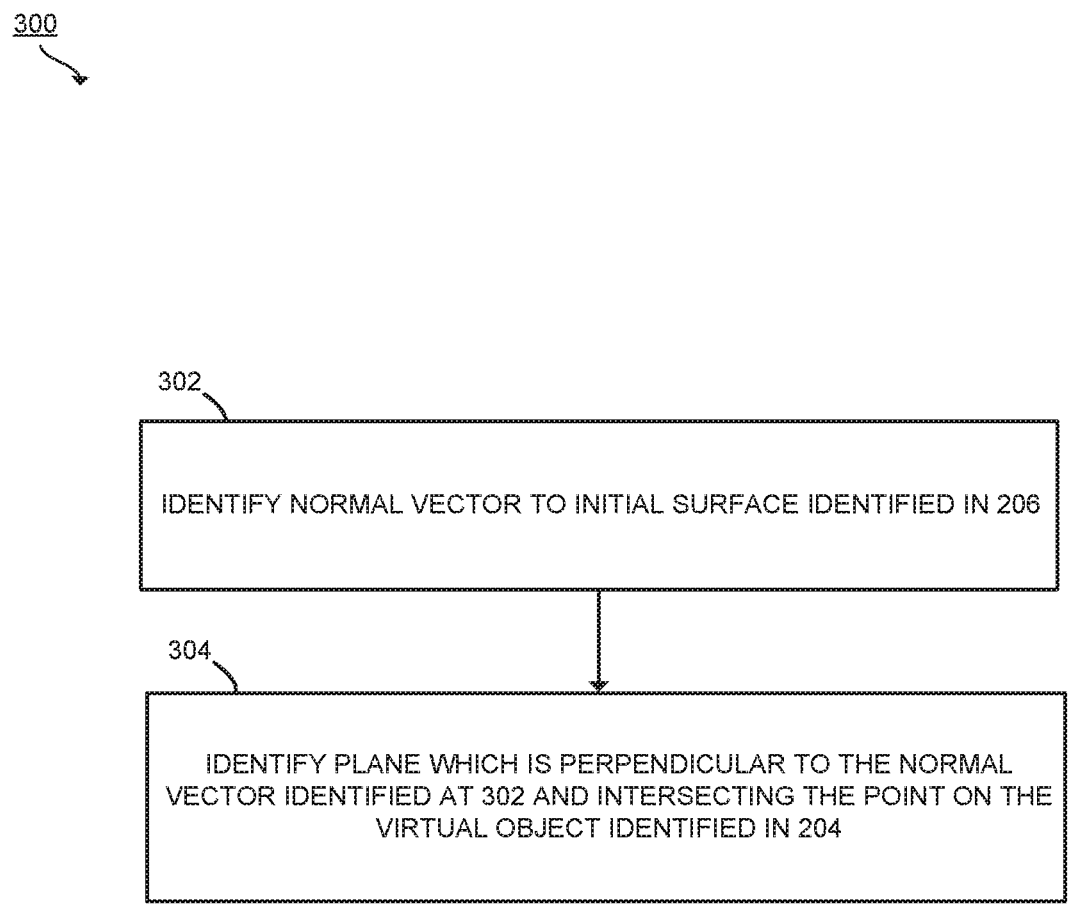
FIG. 3 depicts an example of a process for constructing a control plane, according to certain embodiments.

FIG. 3 depicts a simplified flowchart 300 depicting a method for constructing a control plane, according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 3 may be performed by virtual object location subsystem 106 in cooperation with other components (such as AR framework subsystem 108) depicted in FIG. 1. The processing depicted in FIG. 3 may be performed as part of 208 in flowchart 200 depicted in FIG. 2.

Generally, a control plane may be constructed by constructing a plane that is parallel to the initial surface the object is resting on, and passes through a point selected by a user. One way to do so is using a normal vector of the initial surface, as follows.

At 302, the system identifies a normal vector ("$\vec{n}$") to the initial surface, determined in 206, on which the virtual object is located. The normal vector may be identified based on properties (e.g., directional vectors) of the initial surface determined at 206. In some embodiments, the normal is drawn from a point on the initial surface over which the virtual object sits.

At 304, a plane is identified which is perpendicular to the normal vector identified at 302 and intersecting the point on the virtual object identified in 204. This plane is the control plane P. In some embodiments, the virtual object location subsystem 106 may represent the control plane in point-normal form. In this case, the control plane may be defined by $\vec{n}$, the normal to the initial surface on which the virtual object is located, and the point on the virtual object identified at 204, initial pick point $p_0$. As another example, the virtual object location subsystem 106 may establish a local coordinate system originated at $p_0$ and extend the control plane P along the x- and z-axes of such a local coordinate system. An example of a control plane P 614 which intersects the initial pick point 613 and is perpendicular to the normal 612 is shown in FIG. 6C.

Figure 4:
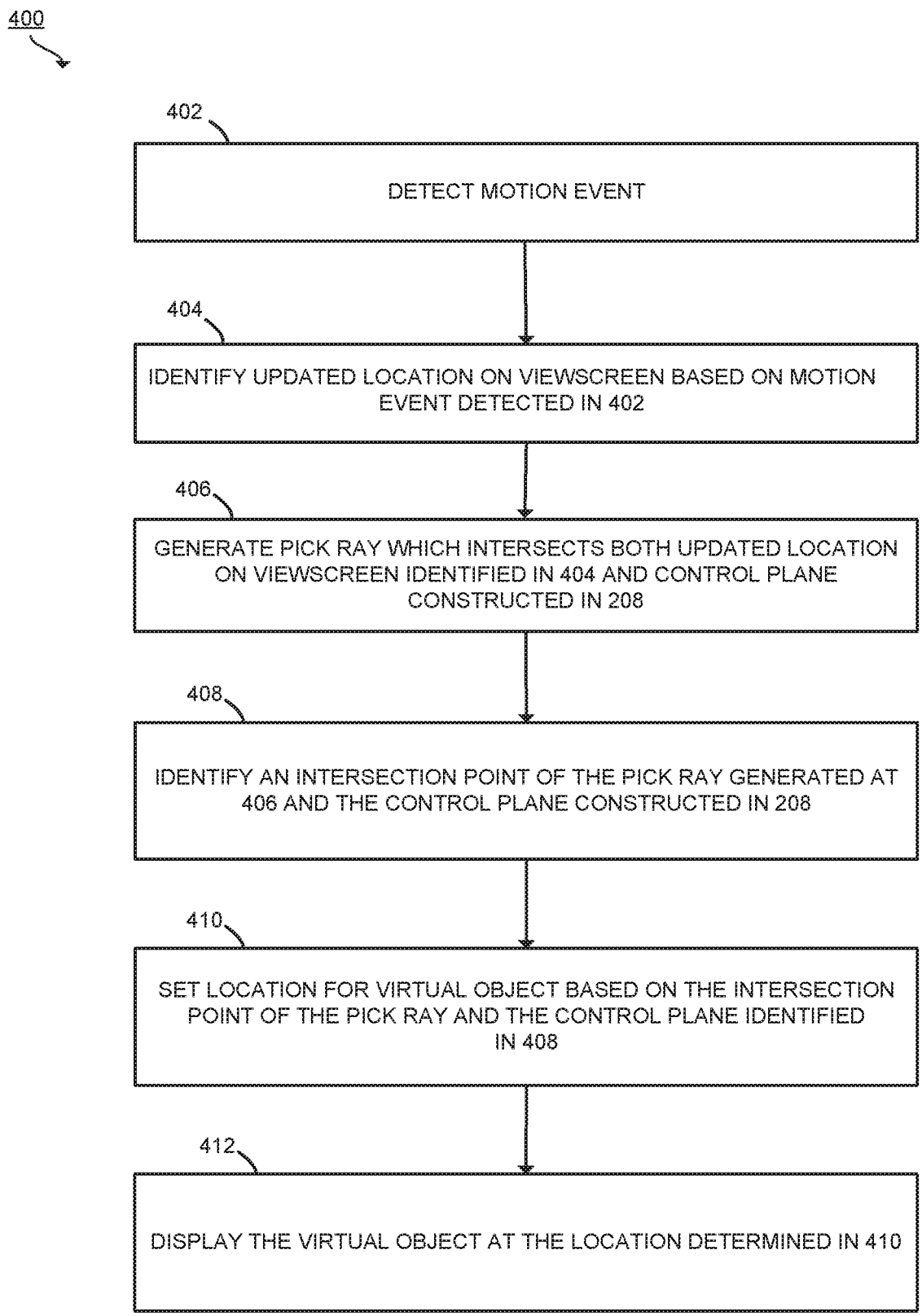
FIG. 4 depicts an example of a process for displaying a virtual object at a determined location within a digital scene responsive to a translation action, according to certain embodiments.

FIG. 4 depicts an example of a flowchart 400 depicting a method for displaying a virtual object at a determined location within a digital scene responsive to a translation action, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 4 may be performed by virtual object location subsystem 106 in cooperation with other components (such as AR framework subsystem 108) depicted in FIG. 1. In certain embodiments, the processing depicted in FIG. 4 may be performed as part of 210 of flowchart 200 in FIG. 2.

In some embodiments, the operations described with respect to FIG. 4 are performed iteratively. For example, the user interacts with a viewscreen by swiping a finger across the viewscreen. The object moves about the viewscreen, following the user's finger. The translation may start at an initial location $p_0$, and then have consecutive locations $p_1$, $p_2$, $p_3$, and so forth, over time.

At 402, a motion event is detected, related to translation of the virtual object by the user. Such a motion event may correspond to a user indicating an updated location on the viewscreen (e.g., by performing a gesture such as dragging a finger across the display to move the virtual object in a particular direction). In some embodiments, the virtual object location subsystem 106 continuously monitors for events corresponding to user input and interactions with the virtual object. The virtual object location subsystem 106 may receive and/or monitor continuous signals indicating that a user, after having selected a particular virtual object in the digital scene using a finger gesture, is moving or dragging the finger (or other interaction devices such as a mouse pointer) smoothly across the display in a particular direction. In some embodiments, the virtual object location subsystem 106 identifies a set of motion events within such continuous signals based on a sample rate (e.g., every 10 milliseconds (ms), 8 ms, or 1 ms, the virtual object location subsystem 106 logs a motion event and corresponding coordinates in screen-space coordinates).

At 404, a point on the viewscreen is identified. The point on the viewscreen represents an updated location of the interaction device (e.g., the user's finger, the mouse, etc.) on the viewscreen. The updated locations over time may be indicated by "$vs_n$," where n=1, 2, 3, . . . for each subsequent updated location. The virtual object location subsystem 106 may identify the updated location $vs_n$ on the viewscreen based on the motion events. In some embodiments, the updated location $vs_n$ on the viewscreen corresponds to a point on the display selected by the user at the time of the motion event. An example of an updated selected location $vs_n$ on the viewscreen is shown in FIG. 6D At 406, a pick ray ("$\vec{r}$") is generated which intersects both the updated location on the viewscreen identified in 404 and the control plane constructed in 208. The pick ray may originate at the camera location, pass through the updated selected location on the viewscreen $vs_n$, and extend into the digital scene. In some embodiments, $vs_n$ is detected in two-dimensional screen-space coordinates. Accordingly, the virtual object location subsystem 106 may translate the detected screen-space coordinates for the $vs_n$ to the world coordinate system. The virtual object location subsystem 106 may set the origin of the pick ray to the location of the camera in world coordinates, and generate the pick ray such that the pick ray passes through the updated selected location $vs_n$ on the viewscreen. The virtual object location subsystem 106 may cast the pick ray to pass through world space at least until the pick ray intersects the control plane P. Such a pick ray and control plane are illustrated in FIG. 6E (pick ray 618 and control plane 614) and 7C (pick ray 706 and control plane 708).

At 408, for a particular updated location, an intersection point on the control plane P where the pick ray generated in 406 intersects the control plane constructed in 208 is identified. The virtual object location subsystem 106 may identify the intersection point, for example, as a function of a the pick ray and the point-normal expression of the control plane.

At 410, the system sets the location $p_n$ for the virtual object based on the intersection point of the pick ray and the control plane identified in 408. In some embodiments, the virtual object location subsystem 106 uses the point identified at step 408 for positioning the virtual object. As a specific example, on the first iteration, the virtual object location subsystem 106 determines an offset between the initial pick point on the virtual object $p_0$ and the updated selected location $p_n$. The virtual object location subsystem 106 determines a translated location for the virtual object which has coordinates defined by a sum of the identified point on the virtual object and the offset. By doing so, a same region of the virtual object coincides with the translated location as coincided with the identified point on the virtual object. For example, if the user initially selected a point near the top of the virtual object, the corresponding region of the virtual object near its top is placed at the translated location. In this particular example, virtual object location subsystem 106 identifies the translated location in terms of moving the virtual object, by the offset, from the original pick point $p_0$ to another point $p_1$. On the second iteration, the virtual object may be translated from $p_1$ to $p_2$, and so forth. The virtual object will translate smoothly in the direction established by viewscreen input.

At 412, the virtual object is displayed in the location determined in 410. In some embodiments, the virtual object location subsystem 106 transmits information characterizing the virtual object location to the AR framework subsystem 108. The determined virtual object location may, for example, be expressed as (X, Y, Z) in world-space coordinates. The AR framework subsystem 108 may change the location of the virtual object from its current location to a new location by overlaying the virtual object on a live image captured by the camera at a point defined by the virtual object location determined in 208. The AR framework subsystem 108 may further use tracking information to track the real-world environment and generate AR content by overlaying the virtual object in the specified location within an AR scene.

As a specific example, a virtual object may be translated using the following instructions:

Vector3 pVector3 objectStartPlane cRay ronTouchStart
    // Receive information selecting point on screen as described at 202 of FIG. 2.
    This initiates the tracking process. //

```
(Touch t){r = computePickRay(t.screenLocation)
    // Compute pick ray based on viewscreen location as described at 204 of FIG.
      2. //
if(p = intersectionOf(r, arObject.mesh))
    // If the pick ray intersects mesh of virtual object at p (e.g. pick point described
      at 204 of FIG. 2.)//
{ objectStart = arObject.translation n = normalOf(arObject.restingPlane)
    // Start translation and determine normal of plane object is resting on as
      described at 302 of FIG. 3. //
c = buildPlane(t, n) } }
    // Build plane based on the normal and the pick point as described at 304 of
      FIG. 3. //
onTouchMoved(Touch t)
    // Detect motion event – new touch point (e.g., vs_n as described at 402 - 404 of
      FIG. 4. //
{ r = computePickRay(p.screenLocation)
    // Compute pick ray r based on new touch point as described at 406 of
      FIG. 4. //
if(i = planeRayIntersection(c, r)
    // Identify intersection point of pick ray control plane based on the new touch
      point as described at 408 of FIG. 4. //
{ offset = i – p arObject.translation = objectStart + offset } }
// Calculate offset between intersection point i and original intersection point. Set
object location to be equal to the original starting location plus the offset as
described at 410 of FIG. 4. //
```

Figure 5A:
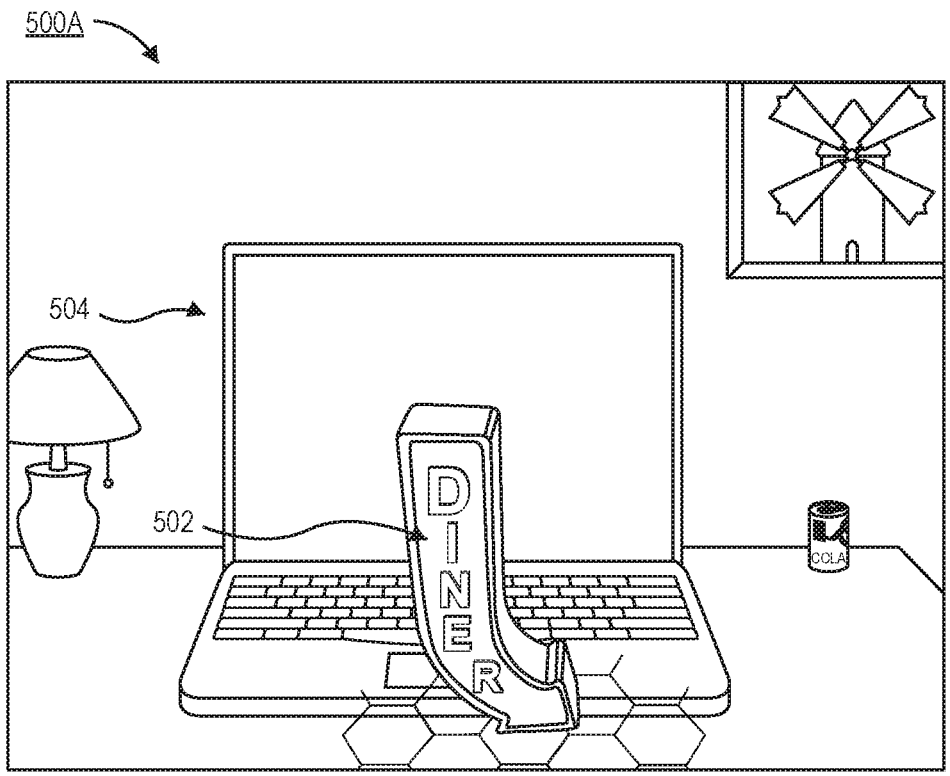
FIGS. 5A-5C depict examples of translating a virtual object in a displayed scene in a digital environment, according to certain embodiments.
Figure 5B:
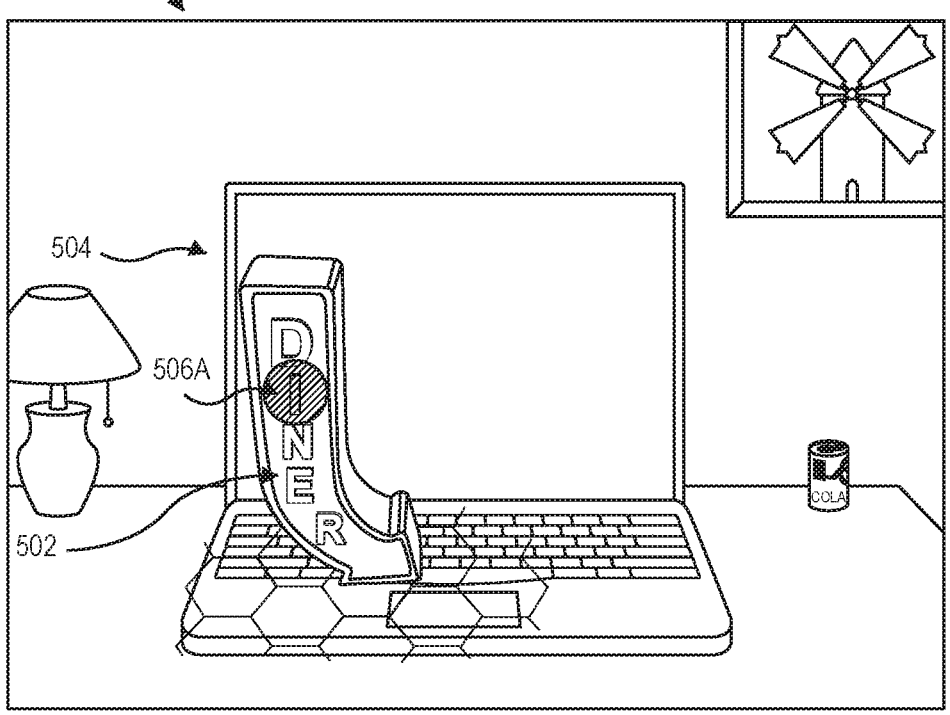
Figure 5C:
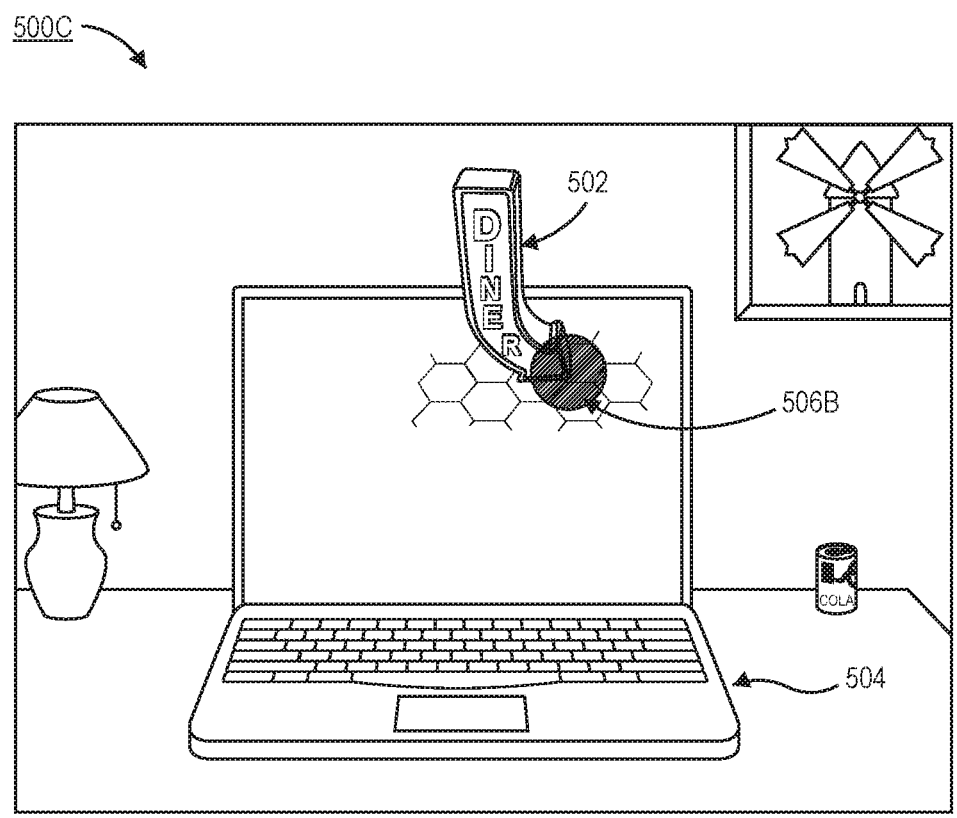

FIGS. 5A-5C depict examples illustrating virtual object translation in a displayed scene in a digital environment, according to certain embodiments. FIG. 5A depicts an interface or viewscreen 500A displaying a AR scene 504 displaying a virtual object 502 (a diner sign) along with other real-world content (e.g., a laptop, a lampshade, a table, etc.). In FIG. 5A, the virtual object 502 is in a first location. FIGS. 5B and 5C show translation of the virtual object 502 to different locations within the AR scene in response to user interactions corresponding to translation actions. For example, in FIG. 5B, the virtual object has been translated to a second location, and in FIG. 5C, the virtual object has been translated to a third location.

In FIG. 5B, a point 506A (which could be a point of contact of the user's fingertip with a touch sensitive screen) represents a point where the user has interacted (e.g., selected and then performed a translation action such as a drag action) with on the virtual object 502 to translate the virtual object 502 from the location depicted in FIG. 5A to the end location for the virtual object 502 depicted in FIG. 5B. In certain embodiments, the point 506A corresponds to the interaction point determined in 204, as described above with respect to FIG. 2.

In FIG. 5C, a point 506B (which could be another point of contact of the user's fingertip with the touch sensitive screen) represents a point where the user has interacted (e.g., selected and then performed a translation action such as a drag action) with on the virtual object 502 to translate the virtual object 502 from the location depicted in FIG. 5B to the end location for the virtual object 502 depicted in FIG. 5C. Point 506B is at a different position on the virtual object 502 than point 506A (e.g., at the bottom of the virtual object 502). This may correspond to the user picking up her finger from point 506A and moving her finger to the bottom of the virtual object 502 before dragging her finger to a new position for the virtual object 502.

Further, in FIG. 5C, the virtual object 502 has been translated to a third location, deeper in the AR scene 504. Upon selecting the point on the virtual object 502, the user may drag her finger across the viewscreen, stopping at point 506B. This may correspond to a motion event, as described at 402 of FIG. 4. The system may then set the updated location for the virtual object via steps 404-410. The end result in the object displayed at a new position as shown in FIG. 5C.

By translating the virtual object 502 as described in FIG. 4, the translation of the virtual object 502 is consistent irrespective of the touch position. The user can move her finger to different parts of the virtual object (e.g., at the top, bottom, or sides), and the object will still move in a realistic manner. This is in contrast with some prior systems, as described above, where user selection of extremities of a virtual object results in unrealistic, distracting effects (e.g., the virtual object moves away from the user's finger and/or jumps around the viewscreen).

Figure 6A:
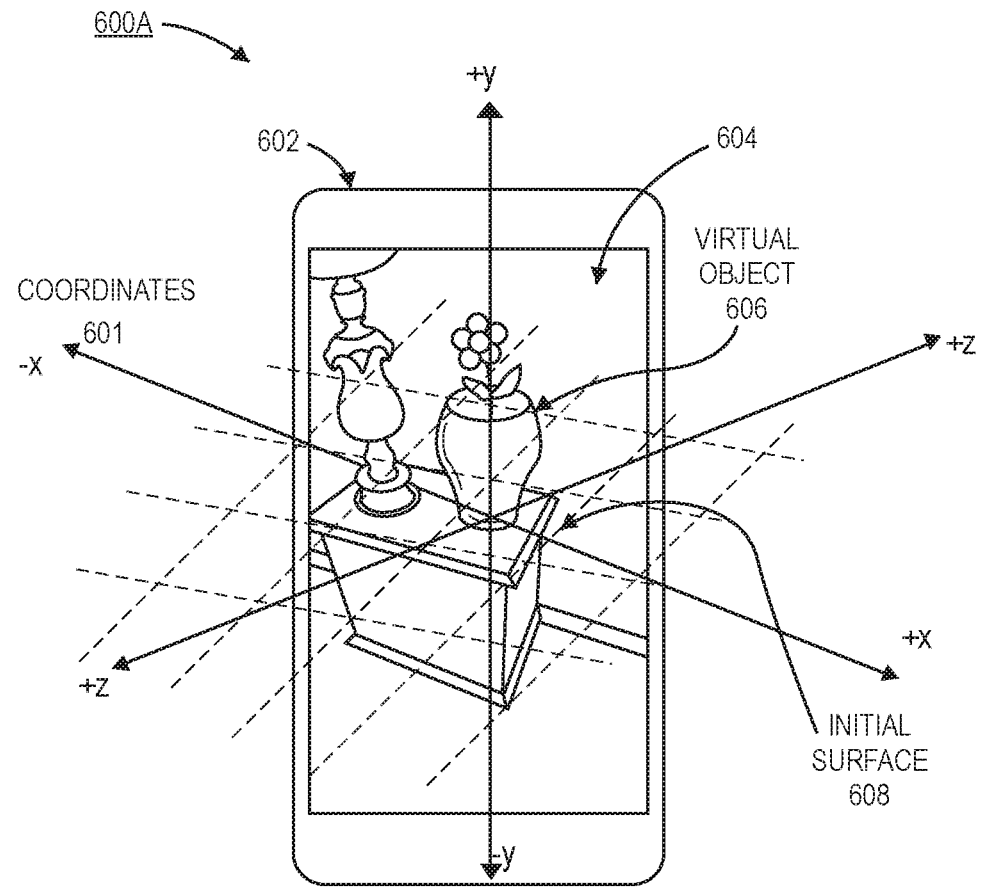
FIGS. 6A-6F depict examples of user interfaces for translating a virtual object, according to certain embodiments.
Figure 6B:
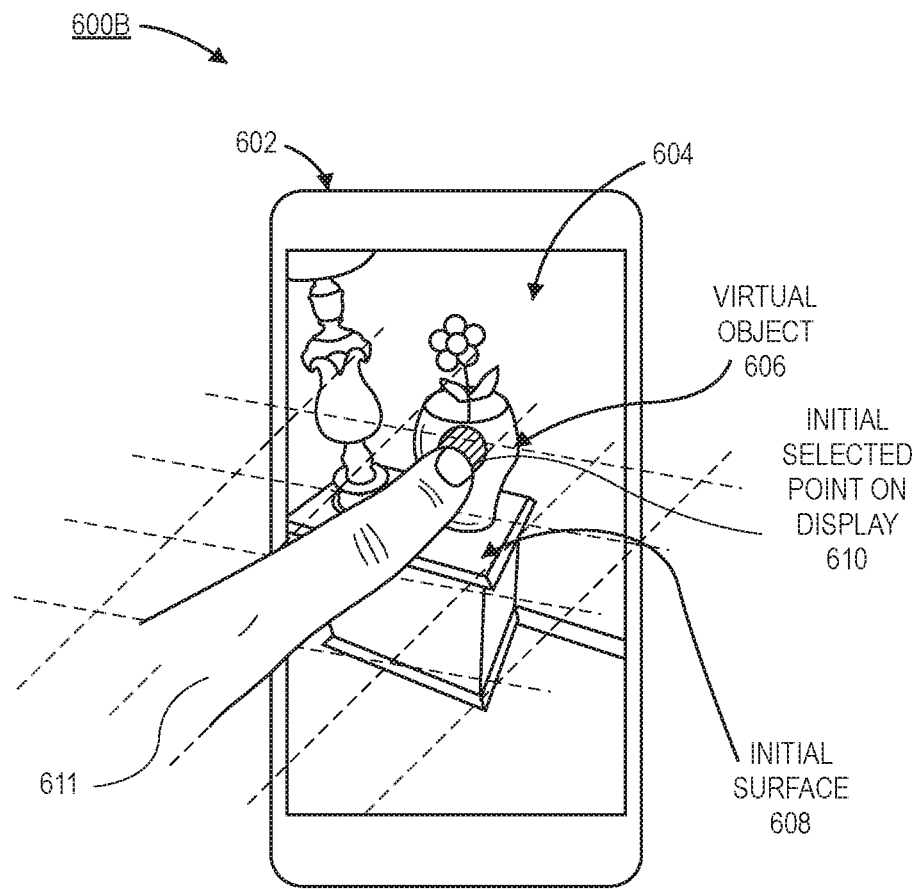
Figure 6C:
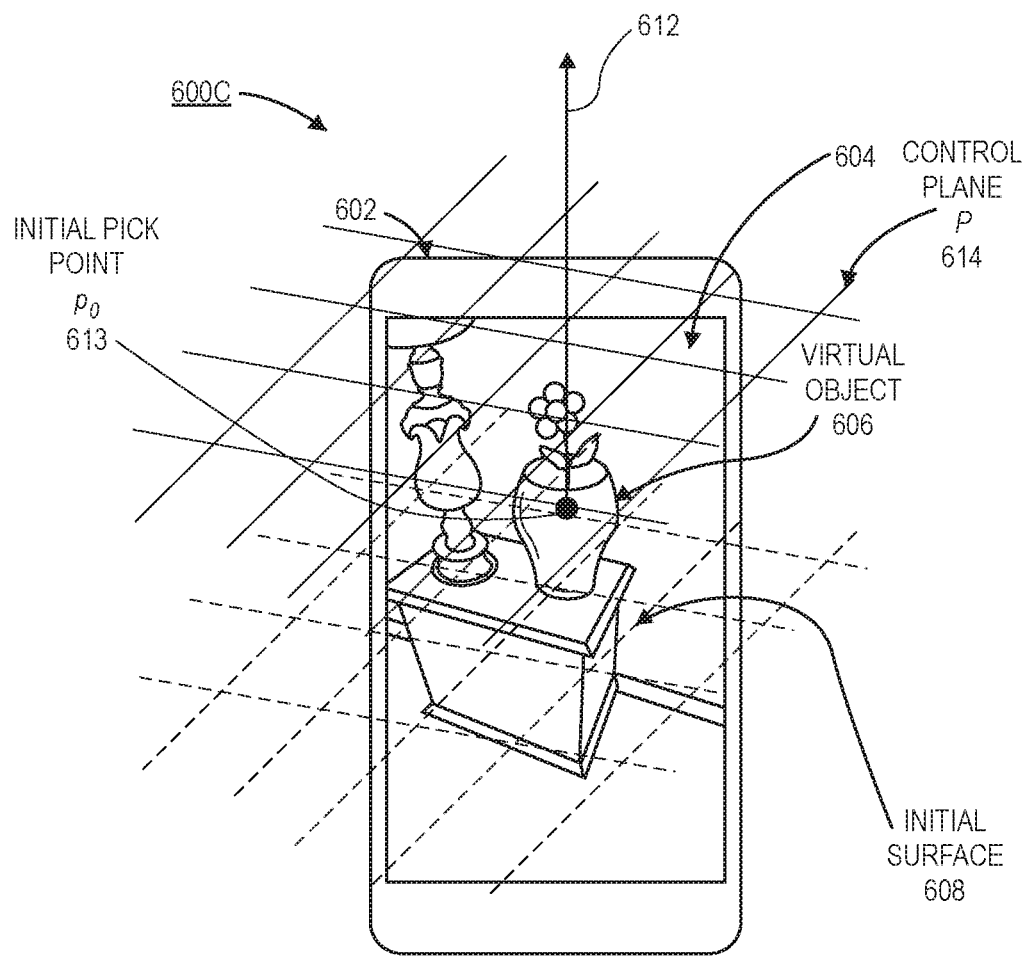
Figure 6D:
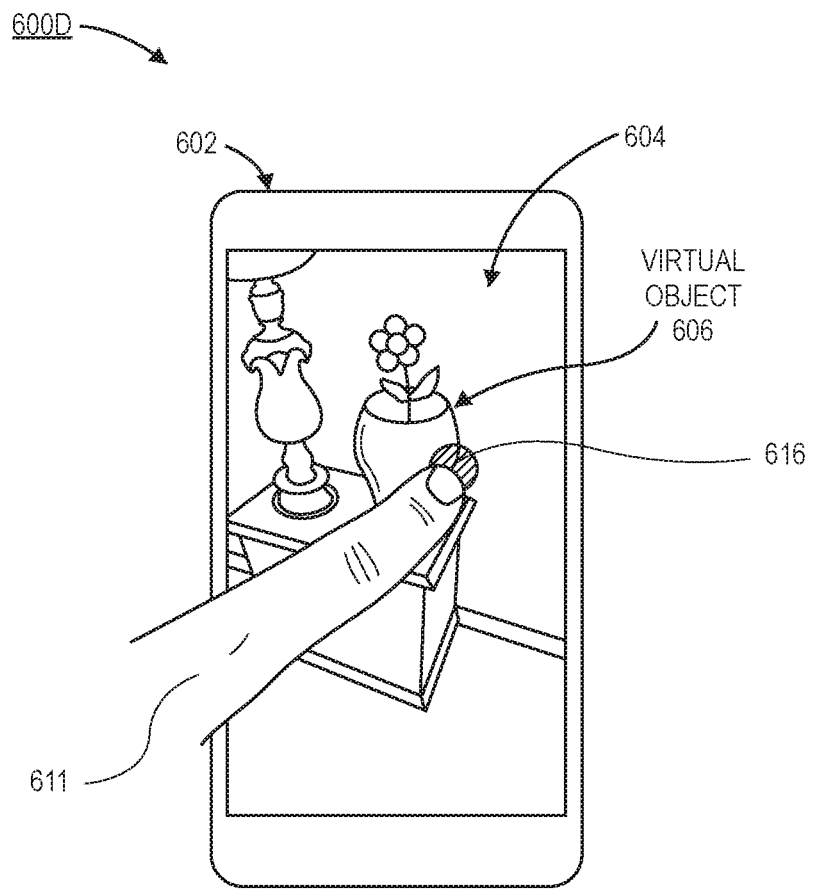
Figure 6E:
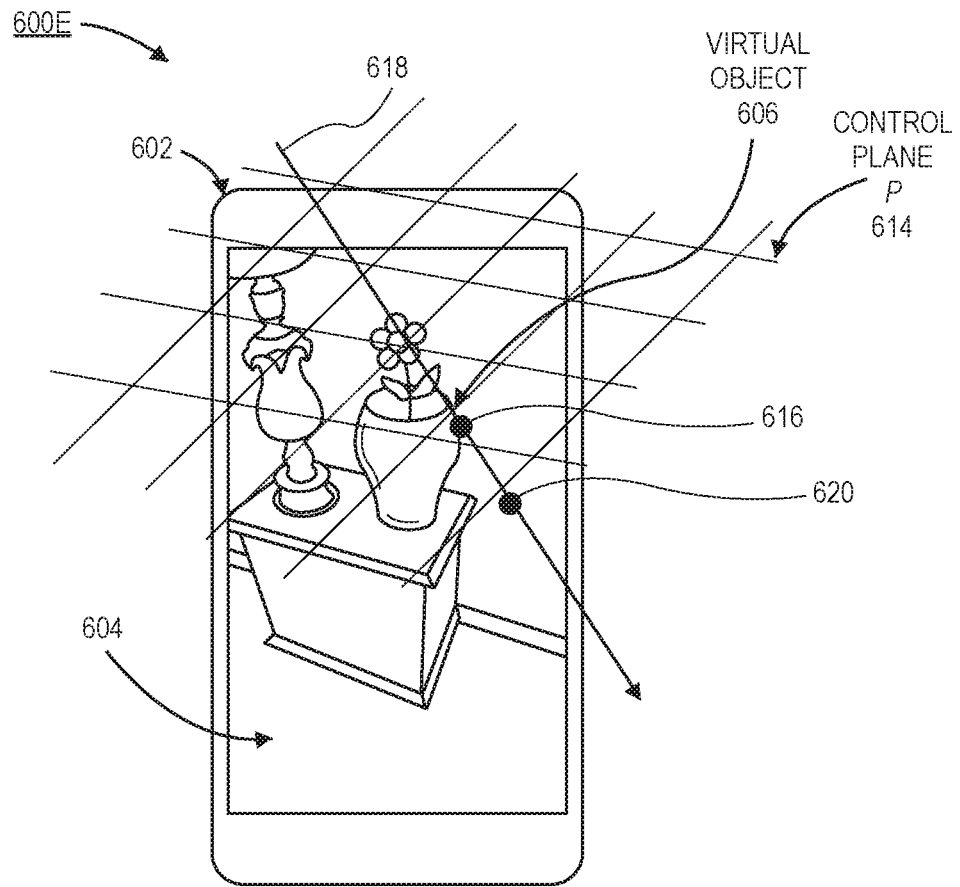
Figure 6F:
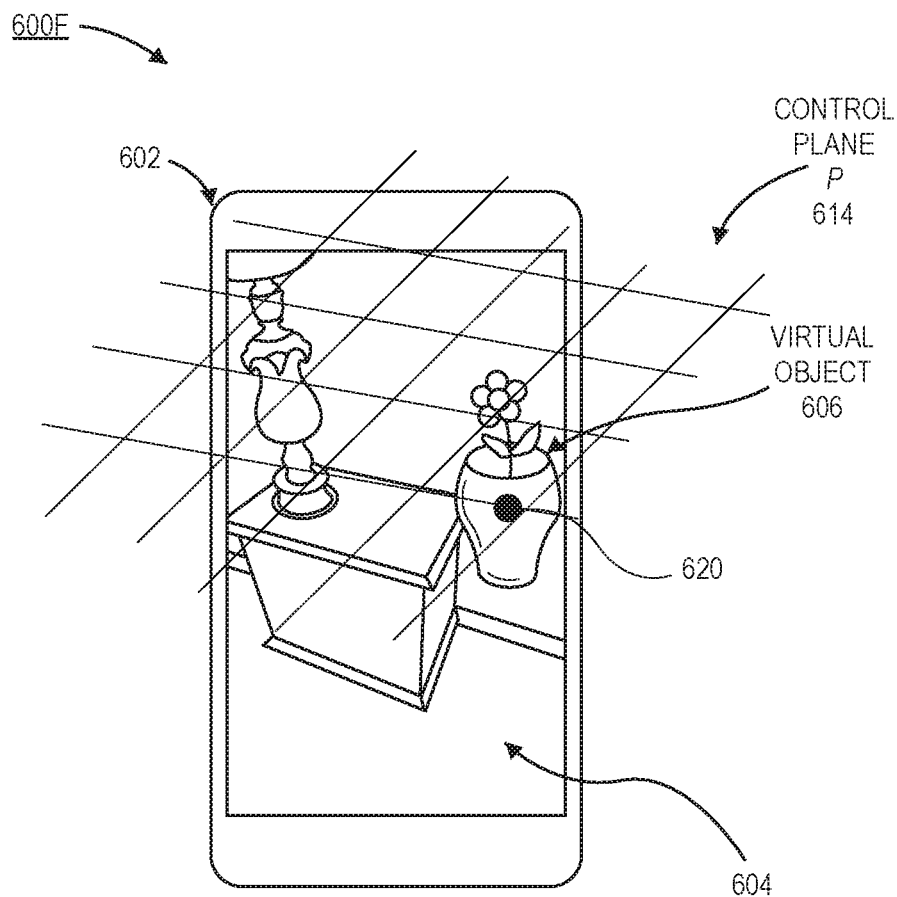

FIGS. 6A-6F depict example user interfaces 600A-600F for translating a virtual object, according to certain embodiments. FIG. 6A shows an interface on a computing device displaying a virtual object, with a local coordinate system originated at the virtual object. FIG. 6B shows an example interface illustrating user-selection of an initial selected point on a viewscreen of a computing device. FIG. 6C shows an interface illustrating a control plane and initial pick point. FIG. 6D shows an example interface illustrating user selection of an updated selected location. FIG. 6E shows an interface illustrating identifying an updated location for the virtual object using the control plane, and FIG. 6F shows an interface illustrating the virtual object in the updated location.

In FIG. 6A, an example interface 600A on a computing device 602 displaying a virtual object 606 is shown. The interface 600A includes a real-world scene 604. The real-world scene 604 includes a table, a floor, and a wall. The interface 600A further includes a virtual object 606 (a vase and flower). The virtual object 606 is superimposed or overlaid on the real-world scene 604.

FIG. 6A further illustrates an initial surface 608 on which the virtual object 606 is located. The system may identify a plane which extends the initial surface outwards (e.g., beyond the table the virtual object 606 is sitting on in FIG. 6A), as indicated by the checked lines extending out from the table.

FIG. 6A also shows an example local coordinate system 601, originated at the virtual object 606. The y-axis extends through the top and bottom of the virtual object 606. In some embodiments, AR systems may identify a local or global y-axis based on the direction of gravity using a gyroscope. As shown in FIG. 6A, the x- and z-axes are orthogonal to the y-axis and centered on the virtual object 606.

In FIG. 6B, an example interface 600B illustrating user-selection of an initial selected point on the display $vs_0$ 610 is shown. In the example illustrated in FIG. 6B, the virtual object 606 is displayed, superimposed on a real-world scene 604, on an interface on computing device 602. A user 611 touches a viewscreen on the computing device 602, selecting the initial selected point on the display $vs_0$ 610.

In FIG. 6C, an example interface 600C illustrating control plane generation is shown. FIG. 6C shows the initial surface 608 on which the virtual object 606 is located. The system identifies a normal 612 to this initial surface 608. The system further identifies an initial pick point on the virtual object $p_0$ 613. Based on this normal 612 and the initial pick point $p_0$ 613, the system generates a control plane 614. As illustrated in FIG. 6C, in this example, the control plane 614 is parallel to the initial surface 608 and perpendicular to the normal 612.

In FIG. 6D, an example interface 600D on a computing device 602 illustrating user selection of an updated selected location on the viewscreen $vs_n$ 616 is shown. As shown in FIG. 6D, the user 611 has selected an updated location on the viewscreen $vs_n$ 616 which is different from the initial selected location on the viewscreen $vs_0$ 610 by interacting with the viewscreen on computing device 602.

In FIG. 6E, an interface 600E illustrating identifying an updated location for the virtual object using the control plane 614 is shown. The system generates a pick ray 618 through the updated selected location on the viewscreen $vs_n$ 616. Pick ray 618 originates at a camera position (which may roughly correspond to the user's eye) and intersects the control plane 614 and $vs_n$ 616 The system identifies a location for positioning the virtual object $p_n$ 620 at the intersection point between pick ray 618 and control plane 614.

In FIG. 6F, an interface 600F illustrating the virtual object 606 in the updated location $p_n$ 620 is shown. As shown in FIGS. 6C and 6F, in this example, the region of the virtual object 606 which was originally intersecting initial pick point $p_0$ 613 is set to intersect with the new location for positioning the virtual object $p_n$ 620.

Figure 7A:
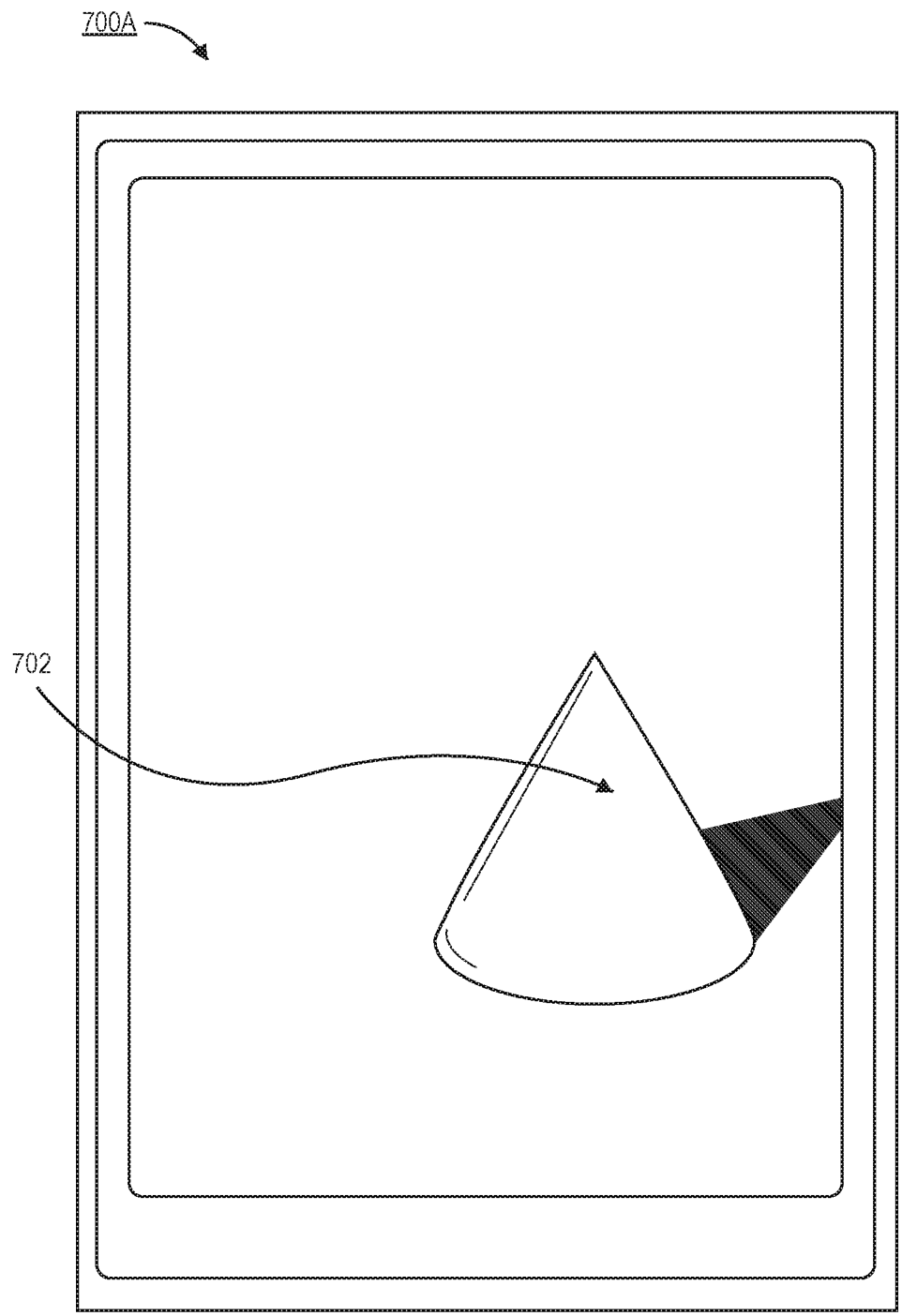
FIGS. 7A-7D depict additional example user interfaces for translating a virtual object, according to certain embodiments.

FIGS. 7A-7D depict additional example user interfaces 700A-700D for translating a virtual object, according to certain embodiments. In FIG. 7A, an example interface 700A on a computing device displaying a virtual object 702 is shown.

Figure 7B:
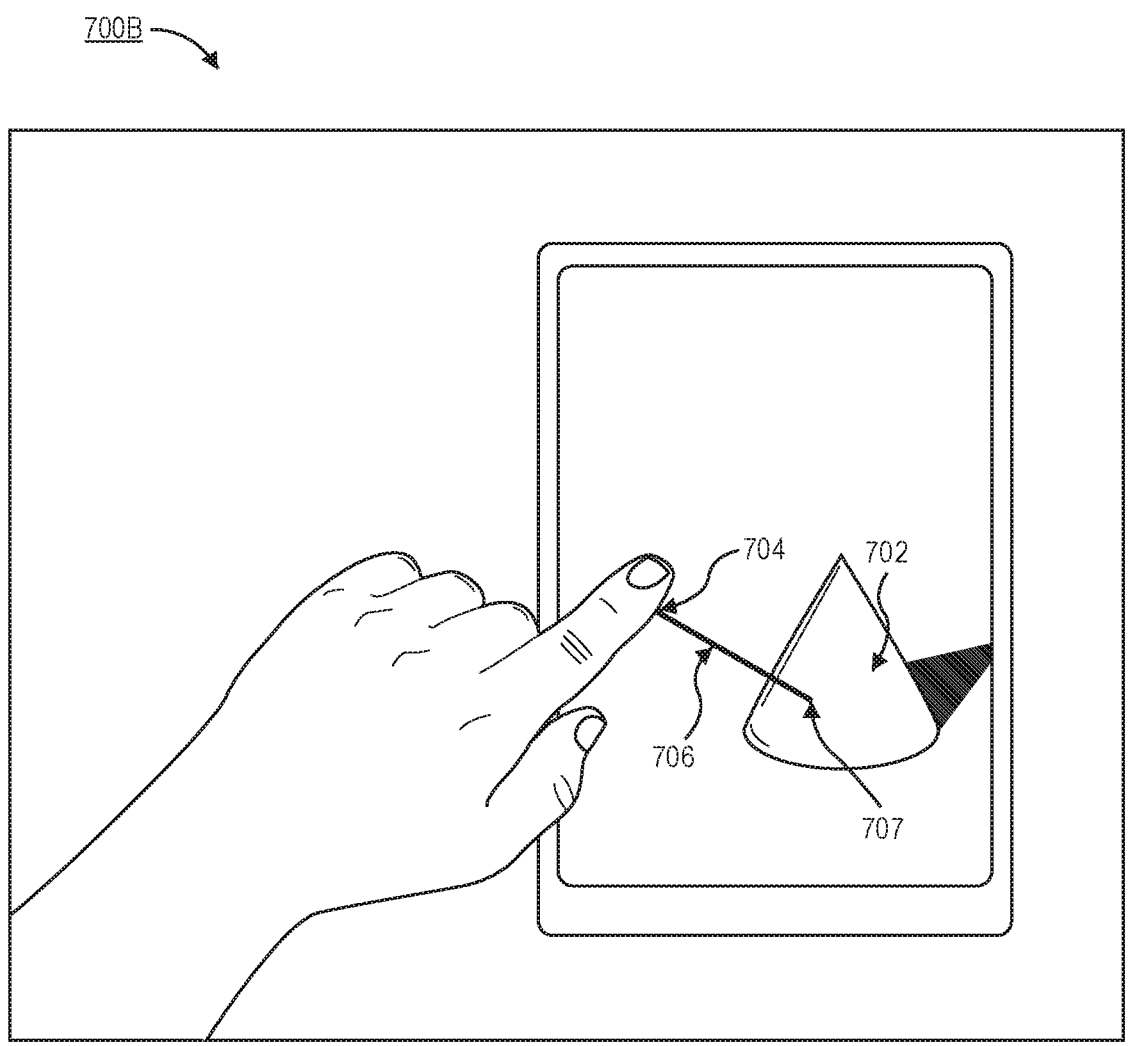

In FIG. 7B, an example interface 700B illustrating user-selection of an initial selected point on the display $vs_0$ is shown. In the example illustrated in FIG. 7B, the virtual object 702 is displayed on an interface on a computing device. A user touches a viewscreen on the computing device, selecting the initial selected point on the display $vs_0$. From the user's perspective, the user is touching the virtual object. The system projects a pick ray 706 from the user's touch location 704 through the scene to calculate a point 707 on the virtual object which can be considered the point the user is "touching."

Figure 7C:
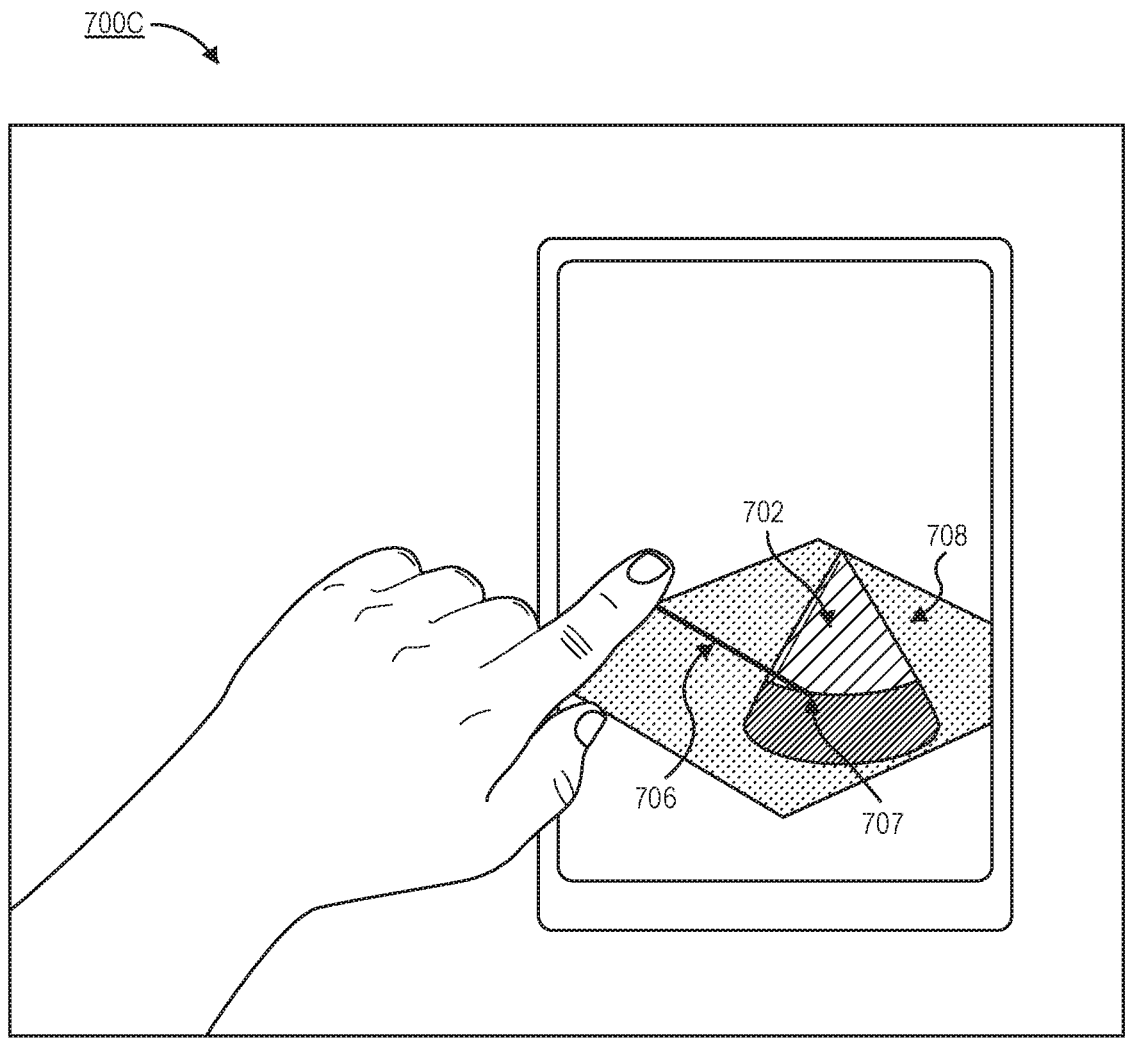

In FIG. 7C, an example interface 700C illustrating control plane generation is shown. An infinite plane, control plane 708, is constructed at point 707 so as to be parallel to a surface the virtual object 702 is resting on. The control plane 708 is not an in-scene visible object, but a purely mathematical representation held in software. The starting location of the virtual object 702 and the initial point of intersection 707 with the pick ray 706 are noted.

Figure 7D:
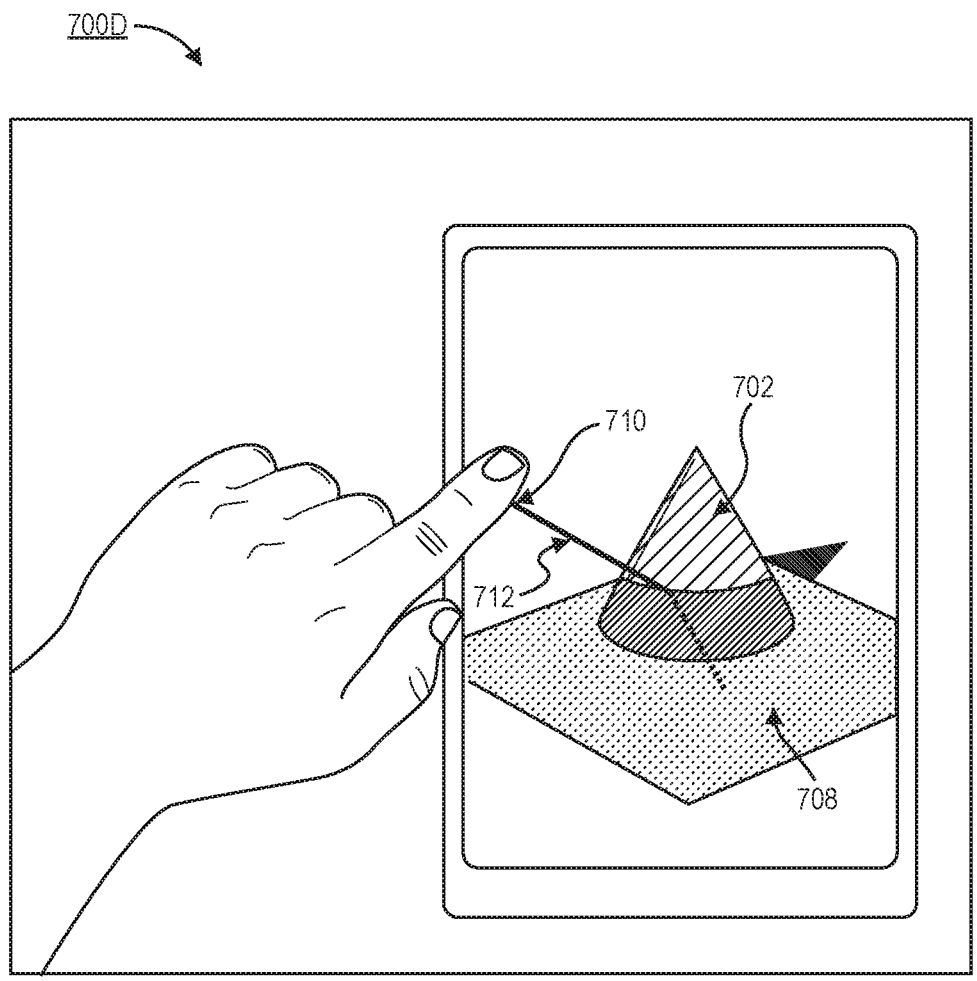

FIG. 7D shows an example interface 700D. The user moves his input (finger) to a new screen location 710. A pick ray 712 is cast from this new location and intersected with the plane 708 established previously. The virtual object 702 is then moved such that the original point of intersection is now coincident with this newly picked point on the plane. The result is that the object 702 moves smoothly and naturally relative to the user's finger (or input device).

Figure 8:
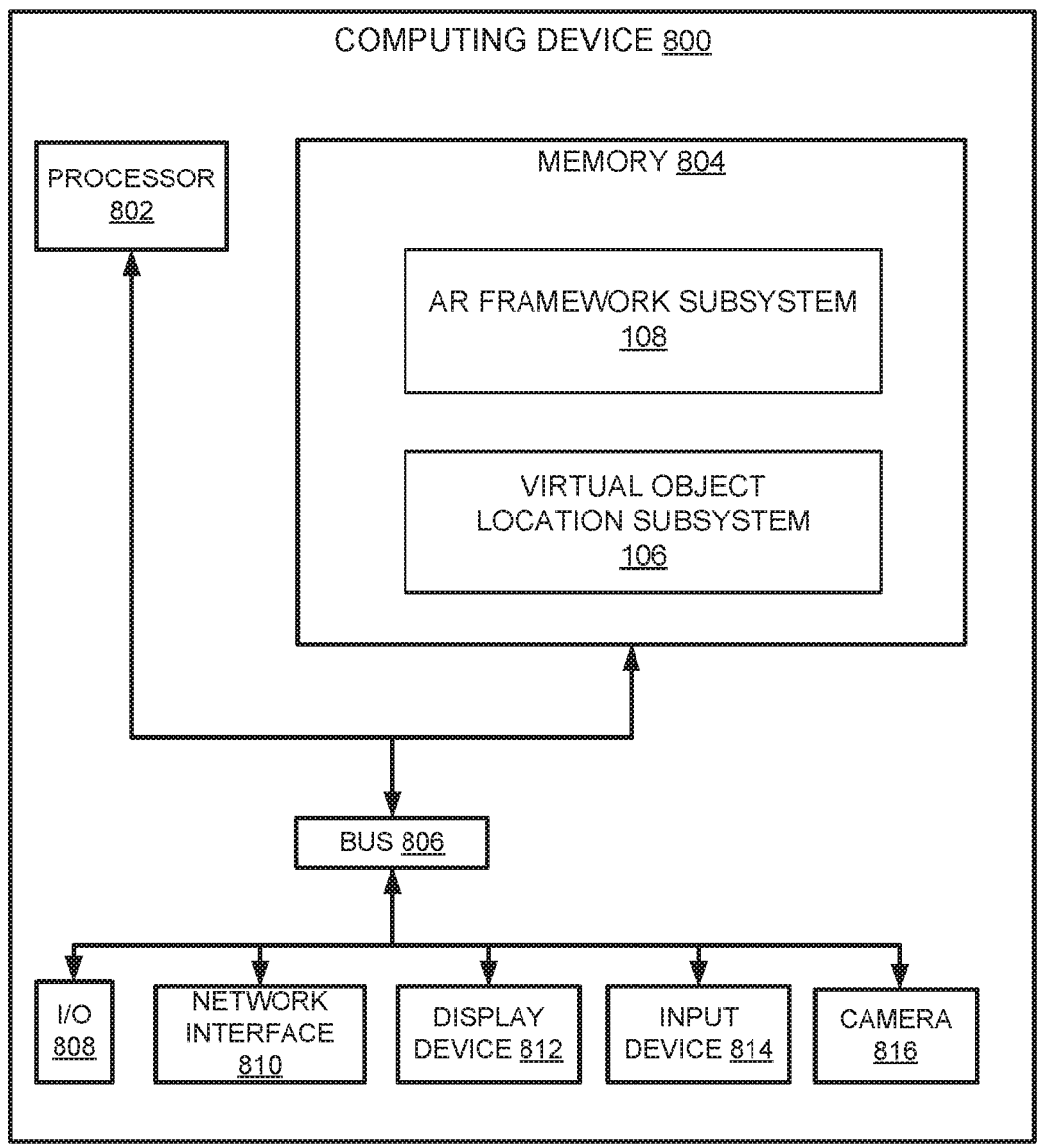
FIG. 8 depicts an example of a computing system that performs certain operations described herein, according to certain embodiments.

Any suitable computing system or group of computing systems can be used for performing the operations described herein. For example, FIG. 8 depicts examples of a computing device 800 that executes an AR framework subsystem 108 and an virtual object location subsystem 106 (as described above with respect to FIG. 2). Computing device 800 depicted in FIG. 8 may be used to implement various systems, subsystems, and servers described in this disclosure.

The depicted examples of a computing device 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing device 800 may also include a number of external or internal devices, such as input or output devices. For example, the Computing device 800 is shown with one or more input/output ("I/O") interfaces 808. An I/O interface 808 can receive input from input devices (e.g., input device 814) or provide output to output devices (e.g., display device 812). One or more buses 806 are also included in the computing device 800. The bus 806 communicatively couples one or more components of a respective one of the computing device 800.

The computing device 800 executes program code that configures the processor 802 to perform one or more of the operations described herein. The program code may correspond to the AR framework subsystem 108 and the virtual object location subsystem 106 and/or other suitable applications that perform one or more operations described herein. The program code may be resident in the memory device 804 or any suitable computer-readable medium and may be executed by the processor 802 or any other suitable processor. In some embodiments, the AR framework subsystem 108 and virtual object location subsystem 106 are stored in the memory device 804, as depicted in FIG. 6. In additional or alternative embodiments, one or more of the AR framework subsystem 108 and virtual object location subsystem 106 are stored in different memory devices of different computing systems. In additional or alternative embodiments, the program code described above is stored in one or more other memory devices accessible via a data network.

In some embodiments, one or more of these data sets, models, and functions are stored in the same memory device (e.g., the memory device 804). For example, a device, such as the computing system 100 depicted in FIG. 1, can host the AR framework subsystem 108 and virtual object location subsystem 106. In additional or alternative embodiments, one or more of the programs, data sets, models, and functions described herein are stored in one or more other memory devices accessible via a data network.

The computing device 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and the like. The computing device 800 is able to communicate with one or more other computing devices via a data network using the network interface device 810. The computing device 800 also includes a camera 816 which could provide functionalities similar to camera 102 depicted in FIG. 1.

Figure 9:
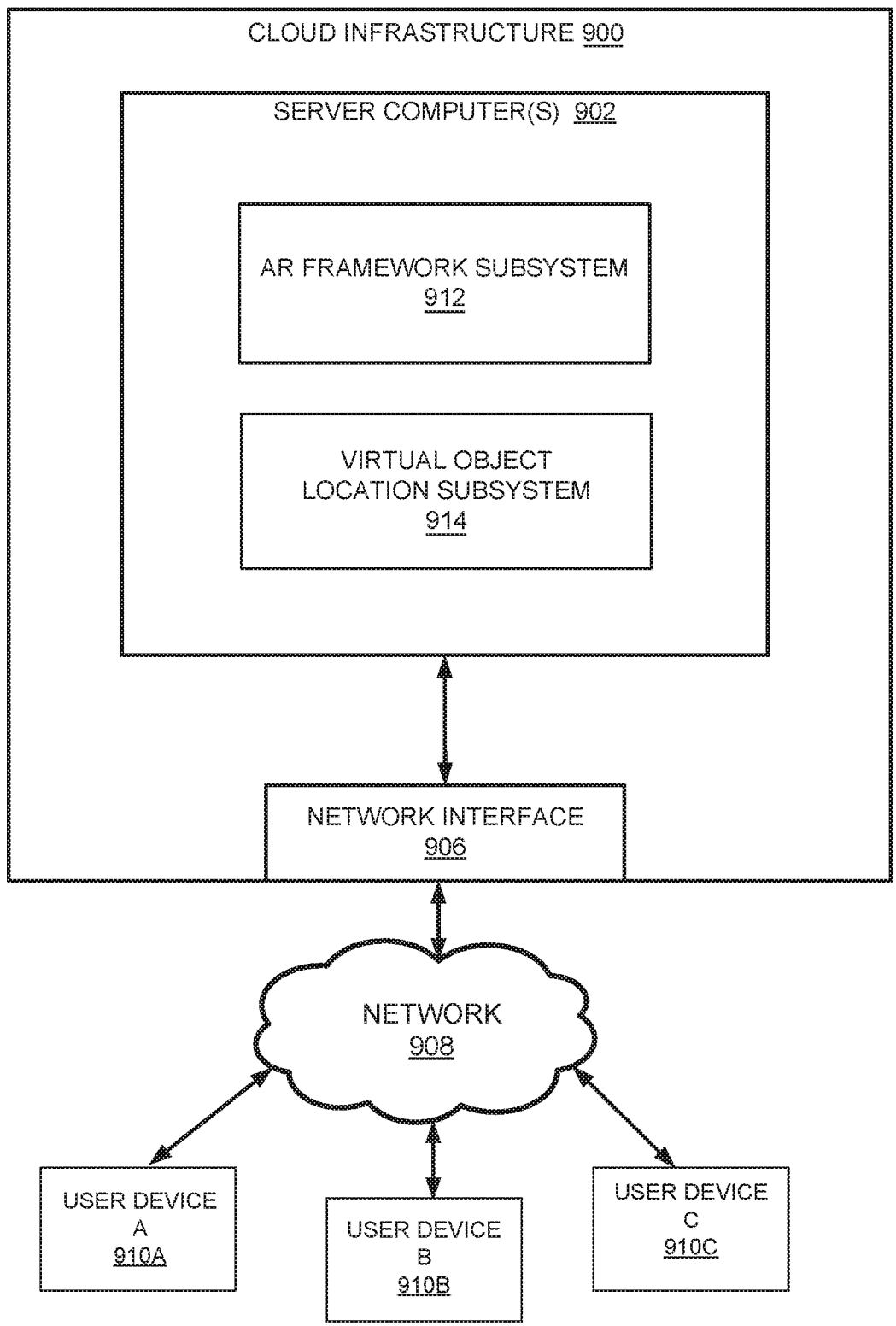
FIG. 9 depicts another example of a computing system that performs certain operations described herein, according to certain embodiments.

In some embodiments, the functionality provided by the computing device 800 may be offered via a cloud-based service provided by a cloud infrastructure 900 provided by a cloud service provider. For example, FIG. 9 depicts an example of a cloud infrastructure 900 offering one or more services including a service that offers virtual object functionality as described in this disclosure. Such as service can be subscribed to and used by a number of user subscribers using user devices 910A, 910B, and 910C across a network 908. The service may be offered under a Software as a Service (SaaS) model. One or more users may subscribe to such as service.

In the embodiment depicted in FIG. 9, the cloud infrastructure 900 includes one or more server computer(s) 902 that are configured to perform processing for providing one or more services offered by the cloud service provider. One or more of server computer(s) 902 may implement an AR framework subsystem 912 which could provide functionalities similar to AR framework subsystem 108 depicted in FIG. 1) and a virtual object location subsystem 914 (which could provide functionalities similar to virtual object location subsystem 106 depicted in FIG. 1). Subsystems 912 and 914 may be implemented using software only (e.g., code, program, or instructions executable by one or more processors provided by cloud infrastructure 900), in hardware, or combinations thereof. For example, one or more of the server computer(s) 902 may execute software to implement the services and functionalities provided by AR framework subsystem 912 and virtual object location subsystem 914, where the software when executed by one or more processors of the server computer(s) 902 causes the services and functionalities to be provided.

The code, program, or instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 902 can include volatile memory, non-volatile memory, or a combination thereof.

In the embodiment depicted in FIG. 9, cloud infrastructure 900 also includes a network interface device 906 that enables communications to and from cloud infrastructure 900. In certain embodiments, the network interface device 906 includes any device or group of devices suitable for establishing a wired or wireless data connection to the network 908. Non-limiting examples of the network interface device 906 include an Ethernet network adapter, a modem, and/or the like. The cloud infrastructure 900 is able to communicate with the user devices 910A, 910B, and 910C via the network 908 using the network interface device 906.

A digital scene, for example, an AR scene, may be displayed by a user device, for example, by user device 910A. The AR scene may display a virtual object along with real-world content. The display of the scene may be facilitated by AR framework subsystem 912. A user of user device 910A may interact with the displayed virtual object and translate the virtual object from an initial location to a new location, for example, by using a finger gesture on a touchscreen of user device 910A. In response, processing for translating the virtual object maybe performed by virtual object location subsystem 914 and the scene displayed on user device 910 A updated to show the smooth and realistic translation of the virtual object.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device. Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
   receiving, by a computing system, information indicating that a user is translating a virtual object from an initial location in an Augmented Reality (AR) scene displayed on a screen of an output device, wherein the virtual object is displayed in the scene along with real-world content captured using a camera;
   identifying, by the computing system, a point on the virtual object based upon the received information;
   identifying, by the computing system, an initial surface in the scene on which the virtual object is located;
   constructing, by the computing system, a control plane passing through the identified point on the virtual object and parallel to the identified initial surface;
   generating, by the computing system, a pick ray originating from a camera location and passing through both a point of interaction on the screen and the control plane;
   identifying, by the computing system, a point on the control plane where the pick ray intersects the control plane;
   setting, by the computing system, a new location for positioning the virtual object in the scene at the point on the control plane where the pick ray intersects the control plane, where the new location is different from the initial location; and
   updating, by the computing system, the scene displayed on the output device by displaying the virtual object in the new location.

2. The method of claim 1, wherein constructing the control plane further comprises computing a normal to the initial surface for use in generating the control plane to be parallel to the initial surface.

3. The method of claim 1, further comprising:
   detecting, by the computing system, a motion event corresponding to user input; and
   based on the motion event, identifying, by the computing system, the point of interaction on the screen of the computing system, wherein the motion event comprises dragging a finger or pointer across the display to indicate an updated location.

4. The method of claim 1, further comprising:
   determining, by the computing system, an offset between the identified point on the virtual object and the new location for positioning the virtual object; and
   determining, by the computing system, a translated location for the virtual object based on a sum of the identified point on the virtual object and the offset, such that a same region of the virtual object coincides with the translated location as coincided with the identified point on the virtual object.

5. The method of claim 1, wherein identifying the initial surface on which the virtual object is located comprises identifying a horizontal plane using a combination of real-world scene information gathered by the camera of the computing system and acceleration information gathered by a sensor of the computing system.

6. The method of claim 1, wherein:
   the scene is displayed via the screen of the output device; and
   identifying the point on the virtual object based on the received information comprises:
   determining, by the computing system, a point on the screen used by the user to interact with the virtual object;
   casting, by the computing system, a pick ray into the scene, where the pick ray originates from a camera location and passes through the point on the screen;
   determining, by the computing system, a point on the virtual object where the pick ray intersects the virtual object; and
   setting, by the computing system, the point on the virtual object where the pick ray intersects the virtual object as the identified point on the virtual object.

7. The method of claim 1, wherein the information is generated based on one or more of user interaction with a touchscreen, user interaction with a mouse, and/or a voice command.

8. A computing system comprising:
   a memory;
   a processor;
   the memory including instructions, which when executed by the processor, cause the processor to perform steps comprising:

receiving information indicating that a user is translating a virtual object from an initial location in an Augmented Reality (AR) scene displayed on a screen of an output device, wherein the virtual object is displayed in the scene along with real-world content captured using a camera;

identifying a point on the virtual object based upon the received information;

identifying an initial surface in the scene on which the virtual object is located;

constructing a control plane passing through the identified point on the virtual object and parallel to the identified initial surface;

generating a pick ray originating from a camera location and passing through both a point of interaction on the screen and the control plane;

identifying a point on the control plane where the pick ray intersects the control plane; and setting a new location for positioning the virtual object in the scene at the point on the control plane where the pick ray intersects the control plane, where the new location is different from the initial location.

9. The computing system of claim 8, wherein constructing the control plane further comprises computing a normal to the initial surface for use in generating the control plane to be parallel to the initial surface.

10. The computing system of claim 8, the steps further comprising:

detecting a motion event corresponding to user input; and based on the motion event, identifying the point of interaction on the screen of the computing system, wherein the motion event comprises dragging a finger or pointer across the display to indicate an updated location.

11. The computing system of claim 8, the steps further comprising:

determining an offset between the identified point on the virtual object and the point of interaction on the screen; and determining a translated location for the virtual object based on a sum of the identified point on the virtual object and the offset, such that a same region of the virtual object coincides with the translated location as coincided with the identified point on the virtual object.

12. The computing system of claim 8, wherein identifying the initial surface on which the virtual object is located comprises identifying a horizontal plane using a combination of real-world scene information gathered by the camera of the computing system and acceleration information gathered by a sensor of the computing system.

13. The computing system of claim 8, wherein the steps further comprise updating the scene displayed on the output device by displaying the virtual object in the new location.

14. A non-transitory computer-readable medium having instructions stored thereon, the instructions executable by a processing device to perform operations comprising:

receive information indicating that a user is translating a virtual object from an initial location in an Augmented Reality (AR) scene displayed on a screen of an output device, wherein the virtual object is displayed in the scene along with real-world content captured using a camera;

identify a point on the virtual object based upon the received information;

identify an initial surface in the scene on which the virtual object is located;

construct a control plane based upon the identified point on the virtual object and the identified initial surface by generating the control plane such that the control plane is parallel to the initial surface and passes through the identified point on the virtual object;

generate a pick ray originating from a camera location and passing through both a point of interaction on the screen and the control plane;

identify a point on the control plane where the pick ray intersects the control plane;

set a new location for positioning the virtual object in the scene at the point on the control plane where the pick ray intersects the control plane, where the new location is different from the initial location; and update the scene displayed on the output device by displaying the virtual object in the new location.

15. The medium of claim 14, the operations further comprising detecting a motion event corresponding to user input; and based on the motion event, identifying the point of interaction on the screen wherein the motion event comprises dragging a finger or pointer across the display to indicate an updated location.

16. The medium of claim 14, the operations further comprising:

determining an offset between the identified point on the virtual object and the point of interaction on the screen; and determining a translated location for the virtual object based on a sum of the identified point on the virtual object and the offset, such that a same region of the virtual object coincides with the translated location as coincided with the identified point on the virtual object.

17. The medium of claim 14, wherein constructing the control plane further comprises computing a normal to the initial surface for use in generating the control plane to be parallel to the initial surface.

* * * * *